US009725953B2

(12) United States Patent
Morikawa et al.

(10) Patent No.: US 9,725,953 B2
(45) Date of Patent: Aug. 8, 2017

(54) ARTICLE STORAGE FACILITY

(71) Applicant: Daifuku Co., Ltd., Osaka-shi (JP)

(72) Inventors: Yasushi Morikawa, Hinocho (JP); Takeshi Abe, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/232,979

(22) Filed: Aug. 10, 2016

(65) Prior Publication Data

US 2017/0044829 A1 Feb. 16, 2017

(30) Foreign Application Priority Data

Aug. 12, 2015 (JP) ................................ 2015-159377

(51) Int. Cl.

| | |
|---|---|
| ***B65G 1/00*** | (2006.01) |
| ***E06C 7/16*** | (2006.01) |
| ***B65G 1/04*** | (2006.01) |
| ***E04G 5/14*** | (2006.01) |
| ***E06C 1/397*** | (2006.01) |
| ***E06C 7/18*** | (2006.01) |
| ***E06C 9/02*** | (2006.01) |

(52) U.S. Cl.

CPC .............. *E06C 7/16* (2013.01); *B65G 1/0407* (2013.01); *E04G 5/14* (2013.01); *E06C 1/397* (2013.01); *E06C 7/185* (2013.01); *E06C 9/02* (2013.01); *B65G 2201/0297* (2013.01)

(58) Field of Classification Search

CPC ........ B65G 1/0407; B65G 1/00; B65G 1/026; E06C 7/16

USPC ................................................. 414/266–286

See application file for complete search history.

(56) References Cited

U.S. PATENT DOCUMENTS

| | | | | |
|---|---|---|---|---|
| 7,191,874 | B2 * | 3/2007 | Tai | B66F 9/072<br>187/244 |
| 8,733,502 | B2 * | 5/2014 | Larson | E06C 1/397<br>182/39 |
| 9,045,282 | B2 * | 6/2015 | Yoshioka | B65G 1/02 |
| 9,169,066 | B2 * | 10/2015 | Morikawa | B65G 1/02 |
| 9,187,300 | B2 * | 11/2015 | Yoshioka | B65G 1/026 |
| 2003/0206789 | A1 * | 11/2003 | Tai | B65G 1/0414<br>414/275 |
| 2010/0150690 | A1 * | 6/2010 | Braun | B65G 1/06<br>414/278 |

(Continued)

FOREIGN PATENT DOCUMENTS

JP 1158191 A 6/1989

*Primary Examiner* — Kaitlin Joerger

(74) *Attorney, Agent, or Firm* — The Webb Law Firm

(57) ABSTRACT

An article transport device and a work platform are movable along a travel path along a rack lateral direction. Article storage racks include a first storage rack installed on a first direction side along a rack fore and aft direction with respect to the travel path, and a second storage rack installed on a second direction side along the rack fore and aft direction with respect to the travel path. A platform storage section for storing the work platform is provided on the first direction side with respect to a trajectory of the article transport device. The platform storage section and the trajectory overlap with each other at least in part as seen along the rack fore and aft direction whereas the platform storage section and the second storage rack overlap with each other at least in part as seen along the rack fore and aft direction.

10 Claims, 20 Drawing Sheets

Y2
X
Z
Y
Y1
W
W
2b(2)
14
1
8
7
10
6
1
14
4
3
8
11
1
13b
(13)
K
24
W
W
2a(2)
13a
(13)

(56) References Cited

U.S. PATENT DOCUMENTS

| | | | | |
|---|---|---|---|---|
| 2013/0216337 | A1* | 8/2013 | Rafols | B66F 9/07 414/279 |
| 2015/0259979 | A1* | 9/2015 | Abe | A47B 87/007 211/153 |
| 2016/0152412 | A1* | 6/2016 | Abe | B65G 1/0407 414/273 |
| 2017/0001800 | A1* | 1/2017 | Fukayama | B65G 1/0407 |
| 2017/0044829 | A1* | 2/2017 | Morikawa | E06C 7/16 |

* cited by examiner

X
Y
Y1
Y2
Z
1
2a(2)
2b(2)
3
4
6
7
8
10
11
13a
(13)
13b
(13)
14
24
K
W

ARTICLE STORAGE FACILITY

CROSS-REFERENCE TO RELATED APPLICATION

This application claims priority to Japanese Patent Application No. 2015-159377 filed Aug. 12, 2015, the disclosure of which is hereby incorporated in its entirety by reference.

FIELD OF THE INVENTION

The present invention relates to an article storage facility having article transport devices and a work platform which a worker can get onto.

BACKGROUND

An article storage facility (automated warehouse) having an article transport device (travel crane (3) for carrying in and out articles) and a work platform (ladder device for maintenance work (5)) is disclosed in JP Publication of Application No. H01-158191. (The reference numerals in brackets in the present background art section are those used in JP Publication of Application No. H01-158191.) In this automated warehouse, a rack (2A, 2B) for storing articles in three dimensions is provided on each side of the crane passage (1) along which the crane (3) travels. The crane passage (1) is installed on the floor side whereas a guide rail (4) for suspending the ladder device (5) is installed on the ceiling side of the crane passage (1). Although the guide rail (4) is installed generally along the crane passage (1), the ladder storage position (4a), which is at one end side of the guide rail (4), separates from the guide rail (4) and is bent toward a side of one of the racks (2A). In other words, the ladder device (5) is configured such that it can be retracted to the ladder storage position (4a) spaced apart from the crane passage (4a) so that the ladder device (5) suspended from the guide rail (4) would not interfere with the crane (3) when transporting an article with the crane (3). (See FIG. 1, etc., of JP Publication of Application No. H01-158191.)

However, when the storage space for the work platform (ladder device (5)) is provided to one side of one (2A) of the pair of racks (2A, 2B), a large area is required along the lateral direction of the racks as an area for installing the article storage facility having the work platform (ladder device (5)) and the racks (2A, 2B). If and when the length along the lateral direction of each rack is important, then a wide area for installation is required whereas, when the racks need to be installed within a given installation area, then the length of the racks along the lateral direction needs to be shortened. In other words, the article storing efficiency for a given installation area decreases in either case.

SUMMARY OF THE INVENTION

In light of the above, an article storage facility is desired in which lowering in its article storage efficiency is reduced and in which a work platform can be stored within the article storage facility.

In one embodiment, an article storage facility comprises: article storage racks each having a plurality of article storage sections for storing articles, with article storage sections arranged one above another along a vertical direction and one next to another along a rack lateral direction, with the vertical direction being defined to be an up-and-down direction, the rack lateral direction being defined to be one direction that is perpendicular to the vertical direction, and a rack fore and aft direction being defined to be a direction that is perpendicular to the vertical direction and the rack lateral direction; an article transport device which is capable of transferring an article between the article transport device and any of the plurality of article storage sections, and which is configured to move along a travel path formed along the rack lateral direction to transport an article; a work platform which a worker can get onto, the work platform being capable of being moved along the travel path and having a ladder; wherein, with a first direction being defined to be one direction along the rack fore and aft direction, a second direction being defined to be a direction that is along the rack fore and aft direction and that is opposite from the one direction, the article storage racks include a pair of storage racks formed by a first storage rack installed on a first direction side with respect to the travel path, and a second storage rack installed on a second direction side with respect to the travel path, wherein the article storage racks include a platform storage section for storing the work platform on the first direction side with respect to a trajectory which is an extent of space which is used exclusively by the article transport device when the article transport device moves along the travel path, wherein the platform storage section and the trajectory overlap each other at least in part, as seen along the rack fore and aft direction, and wherein the platform storage section and the second storage rack overlap each other at least in part, as seen along the rack fore and aft direction.

With the arrangement described above, article storage sections can be provided also in the portion of second storage rack that overlaps with the platform storage section, for additional article storage sections for storing articles. In addition, since the platform storage section and the trajectory overlap with each other at least in part, as seen along the rack fore and aft direction, the article transport device can move along the travel path and transport articles to or from the article storage sections that overlap with the platform storage section as seen along the rack fore and aft direction. Note that the platform storage section may be provided to the first storage rack or may be located to one side, along the rack lateral direction, with respect to the first storage rack.

By disposing the platform storage section so as to overlap with the second storage rack as seen along the rack fore and aft direction in this manner, the storage efficiency of an article storage facility can be proved, compared with a case in which the platform storage section is located to one side, along the rack lateral direction, with respect to both of the storage racks, namely the first storage rack and the second storage rack.

Additional features and advantages of the article storage facility will become clear from the following descriptions of the embodiments described with reference to the attached drawings.

DETAILED DESCRIPTION OF EMBODIMENTS

First Embodiment

Figure 1:
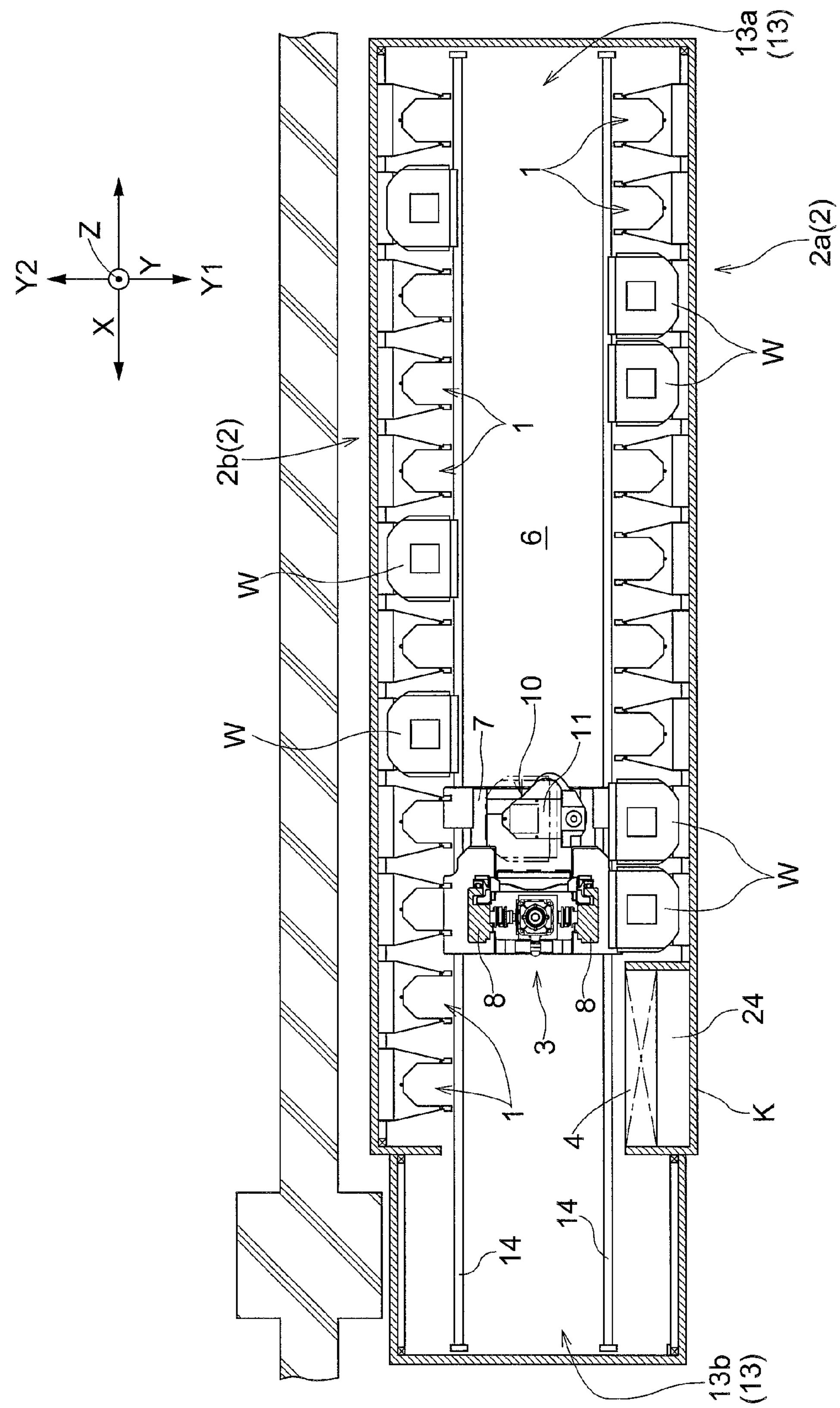
FIG. 1 is a plan view of an article storage facility of the first embodiment.
Figure 2:
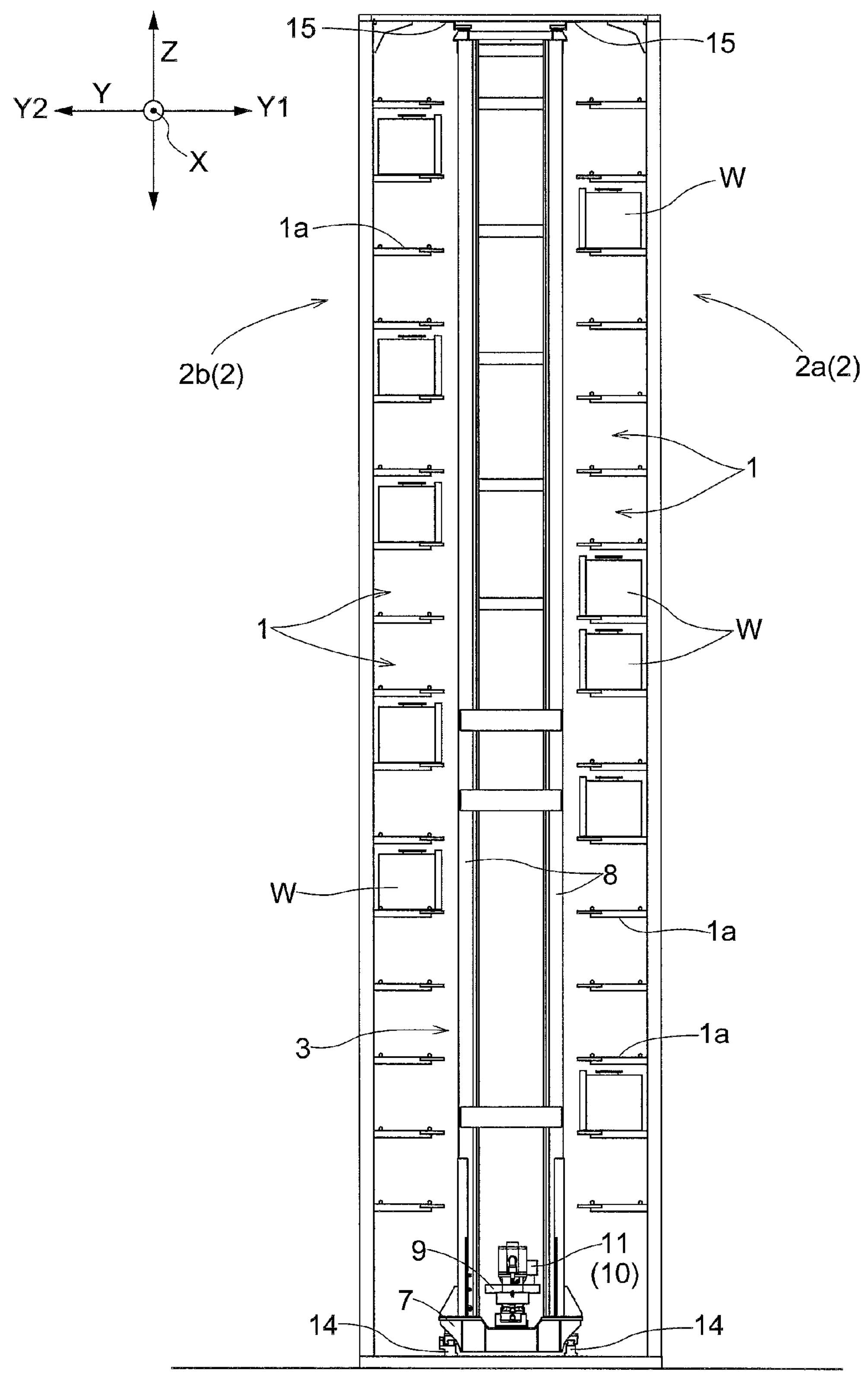
FIG. 2 is a front view of the article storage facility showing article storage racks and a stacker crane of the first embodiment.

The first embodiment of an article storage facility is described next with reference to the drawings. As shown in FIG. 1, the article storage facility includes article storage racks 2 having article storage sections 1, a stacker crane 3 which functions as an article transport device, and a work platform 4. Each article storage section 1 is a location in which a container W as an article is stored. A plurality of article storage sections 1 are arranged one above another along a vertical direction Z as shown in FIG. 2 and one next to another along a rack lateral direction X as shown in FIG. 1. The rack lateral direction X is one of the directions that are perpendicular to the vertical direction Z. The stacker crane 3 moves along the rack lateral direction X to transport containers W one container W at a time. The work platform 4 provides one or more platform surfaces which a worker can be get onto. Note that, in the present embodiment, each container W (article) is a FOUP (Front Opening Unified Pod) for holding one or more semiconductor substrates therein.

As shown in FIG. 1, in the present description, the direction perpendicular to the rack lateral direction X in plan view (as seen along the vertical direction Z) is defined to be the rack fore and aft direction Y. In addition, one direction along the rack fore and aft direction Y is defined to be the first direction Y1 while the other direction along the rack fore and aft direction Y that is opposite from the first direction is defined to be the second direction Y2.

As shown in FIGS. 1 and 2, the stacker crane 3 includes a travel carriage 7 which can move along a travel path 6 formed in front of, or on the front side of, the article storage racks 2, and along the rack lateral direction X, a vertically movable member 9 which can be vertically moved along a mast 8 provided, and arranged vertically, on the travel carriage 7, a transfer device 10 supported by the vertically movable member 9 to transfer the container W between itself and any of the article storage sections 1. As shown in FIGS. 1 and 2, the article storage racks 2 include a pair of storage racks, namely, a first storage rack **2*a* installed on the first direction Y1 side of the travel path 6, and a second storage rack 2*b* installed on the second direction Y2 side of the travel path 6. The first storage rack 2*a* and the second storage rack 2*b* are installed such that the travel path 6 along which the stacker crane 3 moves is located between these racks 2*a* and 2*b* along the rack fore and aft direction Y and such that the front face of the first storage rack 2*a* and the front face of the second storage rack 2*b*** face each other.

The transfer device 10 includes a support portion 11 for supporting a container W, and a projecting and retracting device (not shown) for projecting and retracting the support portion 11 to a retracted position (position shown in FIG. 1) at which the support portion 11 is retracted toward the vertically movable member 9, and to a projected position (not shown) at which the support portion 11 is projected to one side, or in one direction, along the rack fore and aft direction Y with respect to the vertically movable member 9. And the transfer device 10 is configured to be capable of selecting either of the first direction and the second direction as the direction in which the support portion 11 is to be projected from the retracted position, by rotating the projecting and retracting device about a vertical axis. Thus, the transfer device 10 can transfer a container W to and from any article storage section 1 of either of the first storage rack **2*a* and the second storage rack 2*b***.

As shown in FIG. 1, the article storage facility has walls K that surround the perimeter of an interior area 13 in which the article storage racks 2 and stacker crane 3, among other things, are installed. The interior area 13 of the wall K includes a transport area 13*a* and an out-of-the-way area 13*b*. The first storage rack 2*a* and the second storage rack 2*b* are installed in the transport area 13*a* whereas the travel path 6 of the stacker crane 3 is formed to extend through both the transport area 13*a* and the out-of-the-way area 13*b*. The stacker crane 3 moves along the travel path 6 in the transport area 13*a* to transport the containers W, one at a time. In addition, a platform for maintenance purposes (not shown) which a worker can get onto is provided in the out-of-the-way area 13*b* so that the worker who is on the platform for maintenance purposes can perform a maintenance work on a location that is high up in the stacker crane 3 that has been moved into the out-of-the-way area 13*b*.

As shown in FIG. 2, first rails 14 for guiding a lower portion (travel carriage 7) of the stacker crane 3 along the rack lateral direction X are disposed near the floor surface of the article storage facility whereas second rails 15 for guiding an upper portion of the stacker crane 3 along the rack lateral direction X are disposed on the ceiling side of the article storage facility. The first rails 14 and the second rails 15 are disposed along the rack lateral direction X. And A pair of the first rails 14 are located to be spaced apart from each other and a pair of the second rails 15 are located to be spaced apart from each other, along the rack fore and aft direction Y. Note that the travel carriage 7 travels on the pair of first rail 14.

Figure 4:
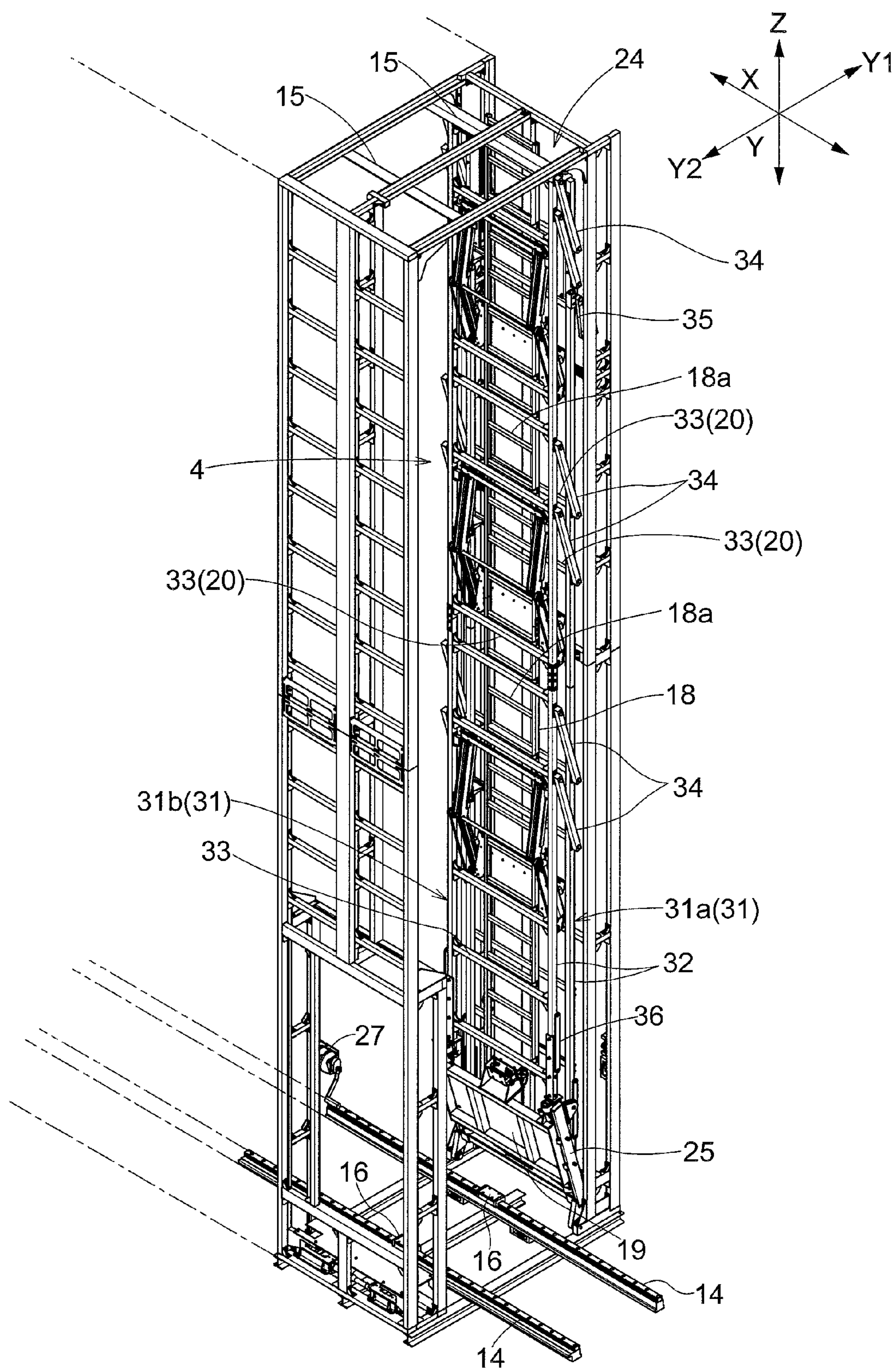
FIG. 4 is a perspective view showing the work platform of the first embodiment in a first state.

As shown in FIG. 4, a guide block 16 for guiding the work platform 4 along the rack lateral direction X is provided to each rail of the pair of the first rails 14. Each guide block 16 is in engagement with the corresponding first rail 14 so that the first rail 14 covers the first rail 14 from above. Each first rail 14 is, or corresponds to, the travel rail installed along the travel path 6 whereas each guide block 16 is, or corresponds to, the guide portion for guiding the carriage portion 19 along the travel path 6. Note that the first rail 14 and the guide block 16 form a linear motion guiding mechanism. When the work platform 4 is not in use, the guide blocks 16 are moved away to the location and out of the moving range of the stacker crane 3, of the first rails 14. When the work platform 4 is in use, the guide blocks 16 are moved to predetermined set positions (positions shown in FIG. 4) relative to the platform storage section 24.

Figure 3:
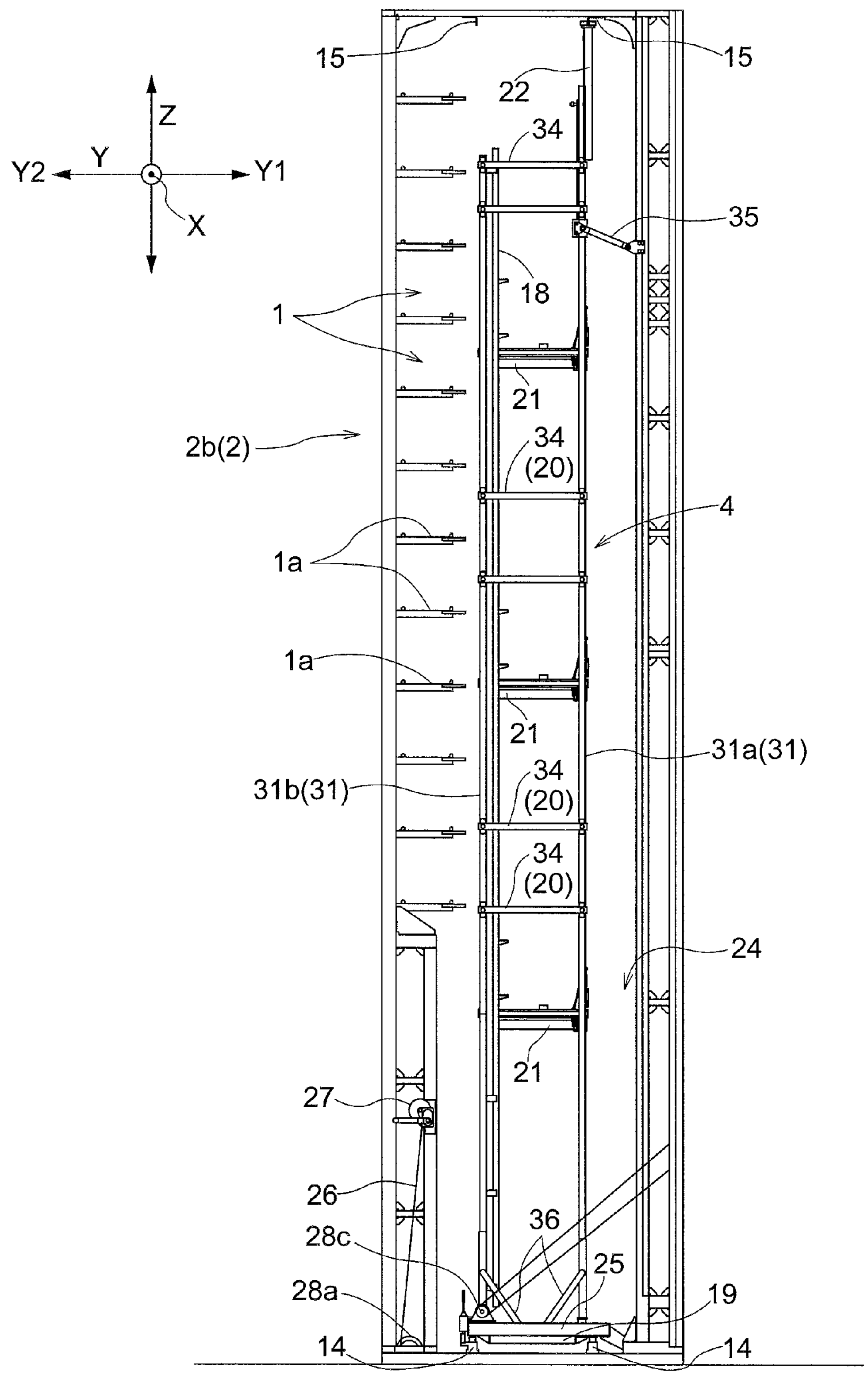
FIG. 3 is a front view of the article storage facility showing article storage racks and a work platform in a second state of the first embodiment.
Figure 5:
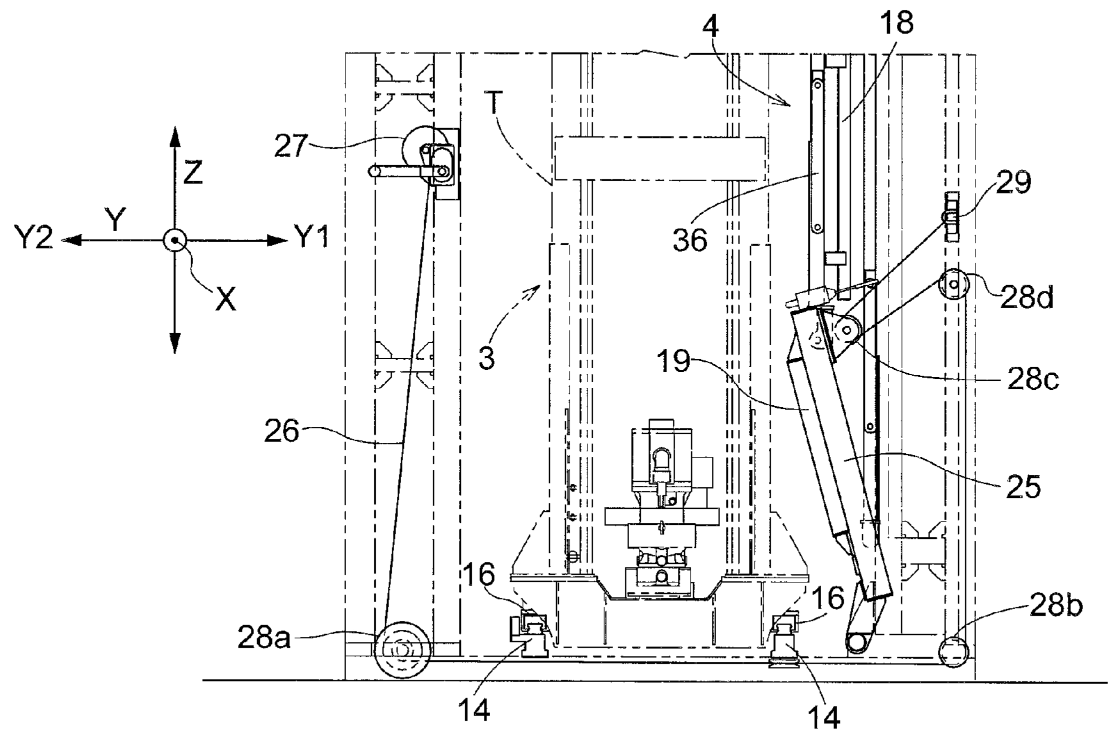
FIG. 5 is a front view showing a lower portion of the work platform of the first embodiment in the first state.

As shown in FIG. 3, the work platform 4 includes a ladder 18 which a worker uses to climb up and down, the carriage portion 19 which supports the ladder 18 and which is movable along the rack lateral direction X, a plurality of fall prevention portions 20 spaced apart from one another along the vertical direction Z, a plurality of platform portions 21 each of which a worker can get onto, an upper guided portion 22 which is guided along the rack lateral direction X by the second rail 15. In this context, the expression "platform portion" is used to refer to a portion adapted to allow a worker to be on to perform work and does not have to form a flat and/or horizontal surface. And as shown in FIG. 5, a platform storage section 24 for storing the work platform 4 is located to the first direction Y1 side with respect to the trajectory T of the stacker crane 3 that moves along the travel path 6. As can be seen from FIG. 1, this platform storage section 24 has a portion that overlaps with the trajectory T and the second storage rack 2*b*, as seen along the fore and aft direction Y. The work platform 4 is configured to be moved along the rack lateral direction X along the travel path 6 and to be capable of being stored in the platform storage section 24. Note that the travel path 6 described above is a path traveled when transporting a container W between an article storage section 1 that is located farthest to one side along the rack lateral direction X and an article storage section 1 that is located farthest to the other side along the rack lateral direction X, of the pair of storage rack of the pair, namely, the first storage rack 2*a* and the second storage rack 2*b*. And the trajectory T mentioned above is a trajectory (or an area) of the stacker crane 3 as it moves along this travel path 6. In other words, the trajectory T can also be said to be an extent of space used exclusively by the stacker crane 3 when it moves along the travel path. In addition, as for the platform storage section 24, the first storage rack 2*a* and the second storage rack 2*b* may be constructed to have the same length along the rack lateral direction X; and, the platform storage section 24 may be provided in one end portion, along the rack lateral direction X, of the first storage rack 2*a* in place of the article storage sections 1 that would have been located there. Alternatively, the first storage rack 2*a* may be constructed to be shorter, along the rack lateral direction X, than the second storage rack 2*b*; and, the platform storage section 24 may be located to one side, along the rack lateral direction X, with respect to the first storage rack 2*a*.

Figure 6:
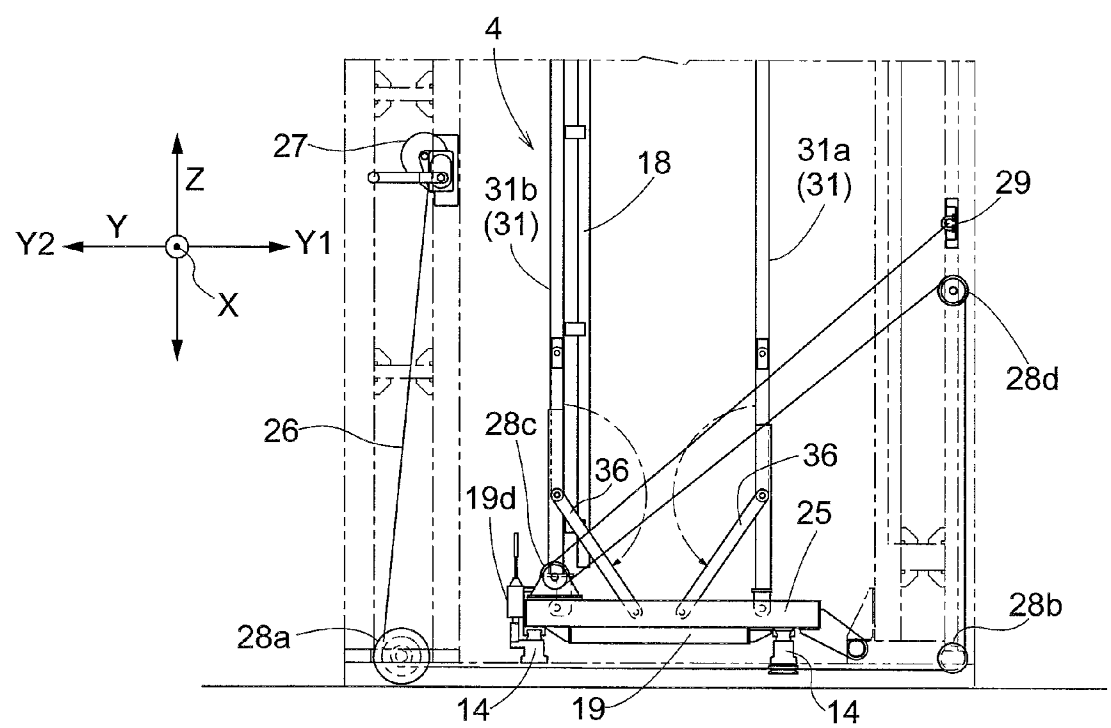
FIG. 6 is a front view showing a lower portion of the work platform of the first embodiment in the second state.

The platform storage section 24 is located to be directly in front of one end portion, along the rack lateral direction X, of the second storage rack 2*b*. As shown in FIGS. 4-6, the platform storage section 24 includes first pivotable members 25 which are pivotable about a pivot axis extending along the rack lateral direction X and which can be connected to the carriage portion 19. The pivot axis about which the first pivotable members 25 pivot is located to the first direction Y1 side with respect to the trajectory T. Note that the first pivotable members 25 are, or correspond to, the pivotable members. And the first pivotable members 25 are configured such that their attitudes can be changed, by being pivoted about the pivot axis, to a first attitude (see FIGS. 4 and 5) in which the first pivotable members 25 are located to the first direction Y1 side with respect to the trajectory T, and to a second attitude (see FIG. 6) in which the first pivotable members 25 have been pivoted from the first attitude to the trajectory T side.

Figure 18:
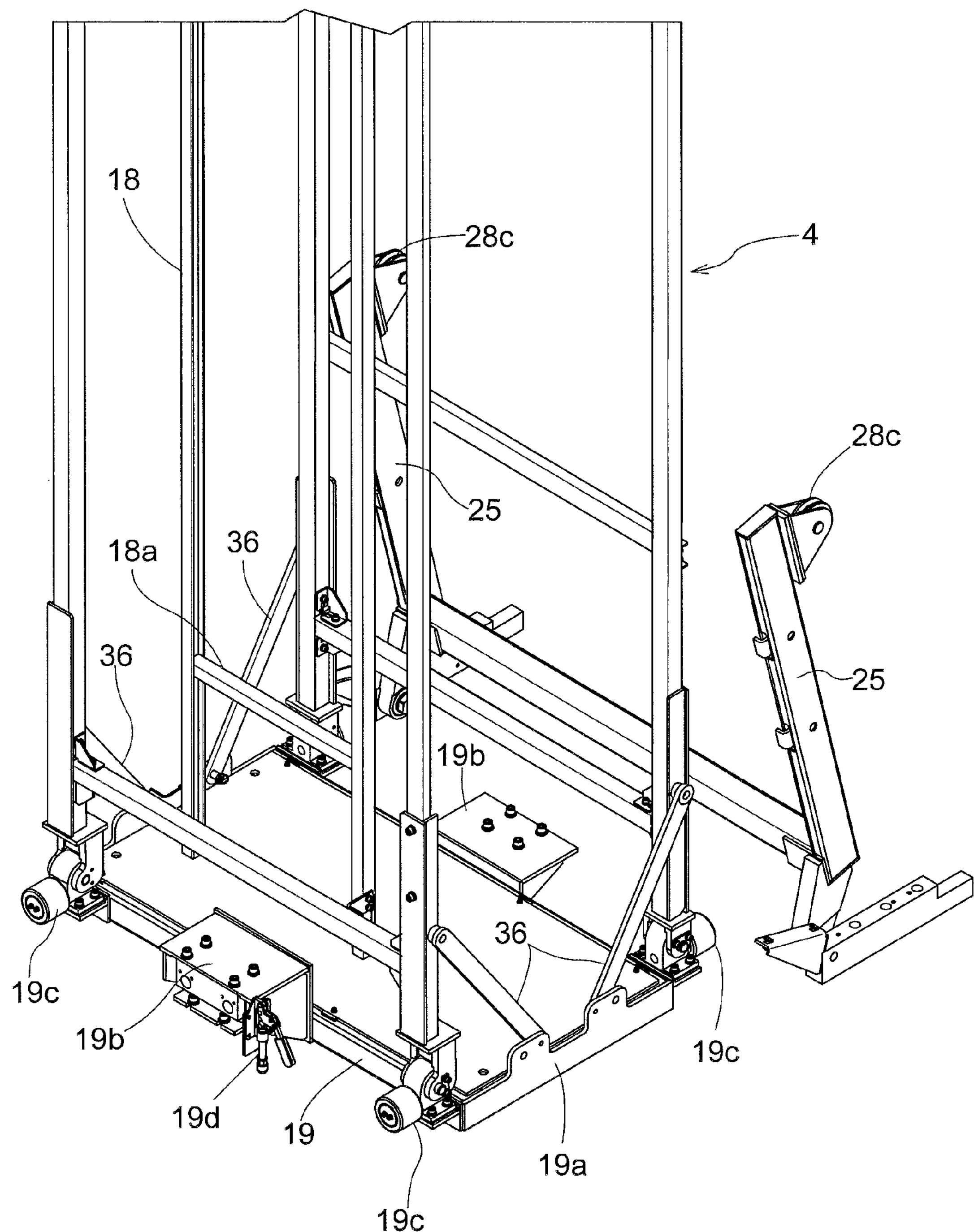
FIG. 18 is a perspective view showing a carriage portion of the first embodiment which is in a fourth attitude and from which the first pivotable members are released.

As shown in FIG. 18, the carriage portion 19 includes first connected portions 19*a* which can be connected to respective first pivotable members 25, second connected portions 19*b* which can be connected to respective guide blocks 16, wheels 19*c* which can roll on the first rails 14, and a first fixing member 19*d* which can selectively restrict or prevent movement of the carriage portion 19 along the rack lateral direction X. Note that the second connected portions 19*b* are, or correspond to, the connected portions. As shown in FIG. 18, when the first pivotable members 25 are in the first attitude as shown in FIG. 5 with the first pivotable members 25 connected to the carriage portion 19 by connecting the first pivotable members 25 to the first connected portions 19*a* of the carriage portion 19, the carriage portion 19 is located to the first direction Y1 side with respect to the trajectory T and is said to be in a third attitude. On the other hand, as shown in FIG. 6, when the first pivotable members 25 are in the second attitude, the carriage portion 19 overlaps with the trajectory T and is said to be in a fourth attitude.

As shown in FIG. 6, the carriage portion 19 is formed such that its dimension along the vertical direction Z is smaller than its dimension along the rack fore and aft direction Y in the fourth attitude, as seen along the rack lateral direction X. The carriage portion 19 is increased in dimension along the rack fore and aft direction Y (i.e., the dimension along the rack fore and aft direction Y of the carriage portion 19 is increased) as its attitude is changed from the third attitude to the fourth attitude, and reduced in dimension along the rack fore and aft direction Y (i.e., the dimension along the rack fore and aft direction Y of the carriage portion 19 is reduced) as its attitude is changed from the fourth attitude to the third attitude. As such, the carriage portion 19 is configured to be capable of being increased and reduced in dimension along the rack fore and aft direction Y. And the work platform 4 is configured to be capable of being changed to a first state in which the carriage portion 19 is reduced in dimension along the rack fore and aft direction Y as shown in FIG. 4, and to a second state in which the carriage portion 19 is increased in dimension along the rack fore and aft direction Y as shown in FIG. 3. The work platform 4 is stored in the platform storage section 24 in the first state, and is moved along the travel path 6 along the rack lateral direction X in the second state.

The carriage portion 19 has the second connected portions 19*b* at such positions that they can be connected to respective guide blocks 16 located at set positions, when the first pivotable members 25 that have been connected to the carriage portion 19 are in the second attitude and the carriage portion 19 is in the fourth attitude. Note that each second connected portion 19*b* is connected to the corresponding guide block 16 by means of a plurality of connectors 19*e*. In addition, the carriage portion 19 is configured such that its state can be changed between: a state in which movement of the carriage portion 19 along the rack lateral direction X is restricted or prevented by operating the engaging-type first fixing member 19*d* to cause the first fixing member 19*d* to engage a rack provided along the first rail 14, with the first pivotable members 25 connected to the carriage portion 19 in the second attitude and with the carriage portion 19 in the fourth attitude; and a state in which movement of the carriage portion 19 along the rack lateral direction X is allowed by releasing the engagement of the first fixing member 19*d* against the rack.

The structures of the work platform 4, as well as other components surrounding it, of the first embodiment are described further next. As shown in FIGS. 3-6, the article transport facility has wires 26 for suspending and supporting the first pivotable members 25, and a winch 27 to which one end portion of each wire 26 is connected and which spools and feeds out the wires 26. Note that the winch 27 is configured such that the wires 26 can be spooled and fed out by a worker by rotating the lever manually. The winch 27 is provided in one end portion, of the second storage rack 2*b*, that is located directly in front of the platform storage section 24. Each wire 26 extending from the winch 27 runs over the first pulley (sprocket) 28*a*, the second pulley (sprocket) 28*b*, the third pulley (sprocket) 28*c*, and the fourth pulley (sprocket) 28*d*, and the other end portion of the wire 26 is connected to the wire connecting portion 29. As shown in FIG. 3, article storage sections 1 are provided above the height at which the winch 27 is located in the one end portion of the second storage rack 2*b*. Note that in FIG. 4, the article support member 1*a* for supporting an article provided to each article storage section 1 is not shown.

As shown in FIGS. 5 and 6, the first pulleys 28*a* are provided at an lower end of the one end portion of the second storage rack 2*b*. The second pulleys 28*b* are provided at the lower end of the platform storage section 24. The third pulleys 28*c* are provided in respective distal end portions of the first pivotable members 25. And the fourth pulleys 28*d* are provided at higher positions in the platform storage section 24 than the second pulleys 28*b*. Each wire 26, which runs over these four pulleys, runs over the first pulley 28*a* and the second pulley 28*b* and then passes under the pair of first rails 14. In addition, as the result of the fact that a portion of each wire 26 (between the portion of the wire 26 that runs over the fourth pulley 28*d* and the other end portion of the wire 26 that is connected to the wire connecting portion 29) runs over the third pulley 28*c*, the first pivotable member 25 is suspended and supported by the wires 26. And as the wires 26 are fed out from the winch 27, the first pivotable members 25 are pivoted downward under its own weight to be changed from the first attitude to the second attitude and to overlap with, or be moved into, the trajectory T. In addition, as the wires 26 are spooled onto the winch 27, the first pivotable members 25 are pulled up and pivoted upward to be changed from the second attitude to the first attitude and to be moved to the first direction Y1 side with respect to the trajectory T.

The work platform 4 includes two pairs of platform masts with each pair having a first platform mast 31*a* and a second platform mast 31*b* that are spaced apart from each other along the rack fore and aft direction Y. The lower end portions of these first platform masts 31*a* and the second platform mast 31*b* are pivotably connected to the carriage portion 19 about respective axes each of which extends along the rack lateral direction X. Each of the first platform mast 31*a* and the second platform mast 31*b* is formed by a pair of vertical frames 32 that extend along the vertical direction Z and that are spaced apart from each other along the rack lateral direction X, and a plurality of horizontal frames 33 that extend along the rack lateral direction X and between the pair of vertical frames 32. And thus each of the first platform mast 31*a* and the second platform mast 31*b* is formed in a shape of a ladder. The second platform mast 31*b* is located on the second direction Y2 side of the first platform mast 31*a*. In addition, ends, on the first direction Y1 side, of connecting members 34 are connected to the first platform mast 31*a* to be pivotably about respective axes, each of which extends along the rack lateral direction X whereas ends, on the second direction Y2 side, of connecting members 34 are connected to the second platform mast 31*b* to be pivotably about respective axes, each of which extends along the rack lateral direction X. Note that two or more connecting members 34 are provided such that they are spaced part from one another along the vertical direction Z. As such, the first platform mast 31*a* and the second platform mast 31*b* are connected to each other through two or more the connecting members 34, and are configured to be moved closer to, and farther away from, each other while remaining parallel to each other.

The distal end portion of each second pivotable member 35 is connected to an upper portion of the first platform mast 31*a*.

The proximal end portion of each second pivotable member 35 is connected to a frame member provided to the platform storage section 24 so that each first pivotable member 25 and the corresponding second pivotable member 35 are disposed to be parallel to each other. As shown in FIGS. 5 and 6, the pair of platform masts 31 are constructed such that, as the work platform 4 is changed (i.e., moved) from the first state to the second state, the first platform mast 31*a* and the second platform mast 31*b* are moved farther apart from each other along the rack fore and aft direction Y while the first platform mast 31*a* and the second platform mast 31*b* are moved along the second direction Y2 to respective positions at which the first platform mast 31*a* and the second platform mast 31*b* overlap with the trajectory T. In addition, the pair of platform masts 31 are constructed such that, as the work platform 4 is changed (i.e., moved) from the second state to the first state, the first platform mast 31*a* and the second platform mast 31*b* are moved closer to each other along the rack fore and aft direction Y while the first platform mast 31*a* and the second platform mast 31*b* are moved along the second direction Y2 until the first platform mast 31*a* and the second platform mast 31*b* are moved to the first direction Y1 side with respect to the trajectory T.

The bar-shaped holding frames 36 are connected to lower end portions of the first platform masts 31*a* and the second platform masts 31*b*. Each of the holding frames 36 connected to the first platform mast 31*a*: has a proximal end portion which is connected the first platform mast 31*a* to be pivotable about an axis that extends along the rack lateral direction X; and is configured to be capable of being changed or moved, by causing to pivot, to a raised attitude (attitude shown in FIG. 5) in which its distal end portion is located at a higher position than its proximal end portion, and to a lowered attitude (attitude shown in FIG. 6) in which its distal end portion is located at a lower position than its proximal end portion. And each holding frame 36 is configured such that its distal end portion can be connected to the first platform mast 31*a* when in the raised attitude and such that its distal end portion can be connected to the carriage portion 19 when in the lowered attitude. In addition, the holding frame 36 that is connected to the second platform mast 31*b* is also similarly configured to be capable of being changed or moved to a raised attitude and to a lowered attitude. And by connecting the distal end portions of the holding frames 36 to the carriage portion 19 with the work platform 4 changed or moved to the second state, the positional relationship between the carriage portion 19, the first platform mast 31*a*, and the second platform mast 31*b* is fixed, as a result of which the work platform 4 is held or maintained in the second state.

The ladder 18 is fixed to the horizontal frames 33 of the second platform mast 31*b*. Thus, as shown in FIGS. 5 and 6, as the work platform 4 is changed or moved from the first state to the second state, the ladder 18 so fixed to the second platform mast 31*b*, is moved in the second direction Y2 with respect to, and away from, the first platform mast 31*a* and to a first position in which the ladder 18 overlaps with the trajectory T. In addition, as the work platform 4 is changed or moved from the second state to the first state, the ladder 18 is moved in the first direction Y1 with respect to, and closer to, the first platform mast 31*a* and to a second position in which the ladder 18 is on the first direction Y1 side with respect to the trajectory T.

Each of a plurality of fall prevention portions 20 is formed by a plurality of connecting members 34 and the horizontal frame 33 of the first platform mast 31*a*. And as the work platform 4 is changed or moved from the first state to the second state, the horizontal frame 33 that forms a part of each fall prevention portion 20 is moved in the first direction Y1 with respect to the second platform mast 31*b* to a third position at which the horizontal frame 33 is spaced apart from the second platform mast 31*b*. In addition, as the work platform 4 is changed or moved from the second state to the first state, the horizontal frame 33 that forms a part of each fall prevention portion 20 is moved in the second direction Y2 with respect to the second platform mast 31*b* to a fourth position at which the horizontal frame 33 is close to the second platform mast 31*b*.

Thus, each of the plurality of fall prevention portions 20 is configured to be movable to the fourth position and to the third position at which it is closer to the ladder 18 along the rack fore and aft direction Y than when it is at the fourth position. An ascending and descending area which is an extent of space through or in which a worker uses, and climbs up and down, the ladder 18 is formed between the plurality of fall prevention portions 20 in their fourth position and the ladder 18. The first platform mast 31*a*, the second platform mast 31*b*, the first pivotable members 25, and the second pivotable members 35 operatively connect the carriage portion 19, the ladder 18, and the plurality of fall prevention portions 20. Thus, as the carriage portion 19 is changed or moved from the fourth attitude to the third attitude, the ladder 18 is moved from the second position to the first position, and the plurality of fall prevention portions 20 are moved from the fourth position to the third position. In addition, as the carriage portion 19 is changed or moved from the third attitude to the fourth attitude, the ladder 18 is moved from the first position to the second position and the plurality of fall prevention portions 20 are moved from the third position to the fourth position. In other words, an operatively connecting portion which operatively connects the plurality of fall prevention portions 20 with the carriage portion 19 is formed by the first platform mast 31*a*, the second platform mast 31*b*, the first pivotable members 25, and the second pivotable members 35.

As shown in FIGS. 11-14, an upper guided portion 22 is supported by an upper end portion of the first platform mast 31*a*. And with the first pivotable members 25 connected to the carriage portion 19 and with the carriage portion 19 changed to the third attitude, the upper guided portion 22 is located directly below the second rail 15 on the first direction Y1 side, along the rack fore and aft direction Y, of the pair of second rails 15. In addition, the upper guided portion 22 has a plurality of pairs of first guide rollers 22*a* with each pair consisting of two first guide rollers 22*a* that are located next to each other along the rack fore and aft direction Y. The upper guided portion 22 is supported by the first platform mast 31*a* such that the upper guided portion 22 can be moved to a lowered position and to a raised position higher than the lowered position. The entire upper guided portion 22 can be located at a lower position than the second rail 15 by lowering the upper guided portion 22 to its lowered position, so that the upper guided portion 22 would not interfere with the second rail 15 when the carriage portion 19 is pivoted. In addition, by raising the upper guided portion 22 to its raised position, the second rail 15 comes to be located between the pair of first guide rollers 22*a* that are located next to each other along the rack fore and aft direction Y, so that the second rail 15 can guide the work platform 4 along the rack lateral direction X while restricting its movement along the rack fore and aft direction Y. The upper guided portion 22 is configured such that its state in each of the lowered position and the raised position can be changed, by operating second fixing members 22*b* and by inserting and removing lock pins 22*c*, to a state in which the upper guided portion 22 is fixed to the first platform mast 31*a*, and to a state in which the upper guided portion 22 is released from the fixed state (from the first platform mast 31*a*).

The work platform 4 includes platform portions 21 which a worker can get onto and which are located on the first direction Y1 side (side in which the worker can climb up and down or "ascending and descending side") with respect to the ladder 18. Each platform portion 21 has a platform surface 21*a* which a worker can get onto. The work platform 4 is configured to be changed or moved to a fifth state and a sixth state. The fifth state is a state of the work platform 4 in which the platform surface 21*a* extends generally along the vertical direction Z and the rack lateral direction X and in which the platform surface 21*a* is located on the first direction Y1 side with respect to an ascending and descending area which is an extent of space through or in which a worker uses, and climbs up and down, the ladder 18 (i.e, on the side opposite from the side the ladder 18 is located with respect to the vertical space). The sixth state is a state of the work platform 4 in which the platform surface 21*a* extends along the rack lateral direction X and the rack fore and aft direction Y and in which the platform portion 21 overlaps with the ascending and descending area.

Figure 8:
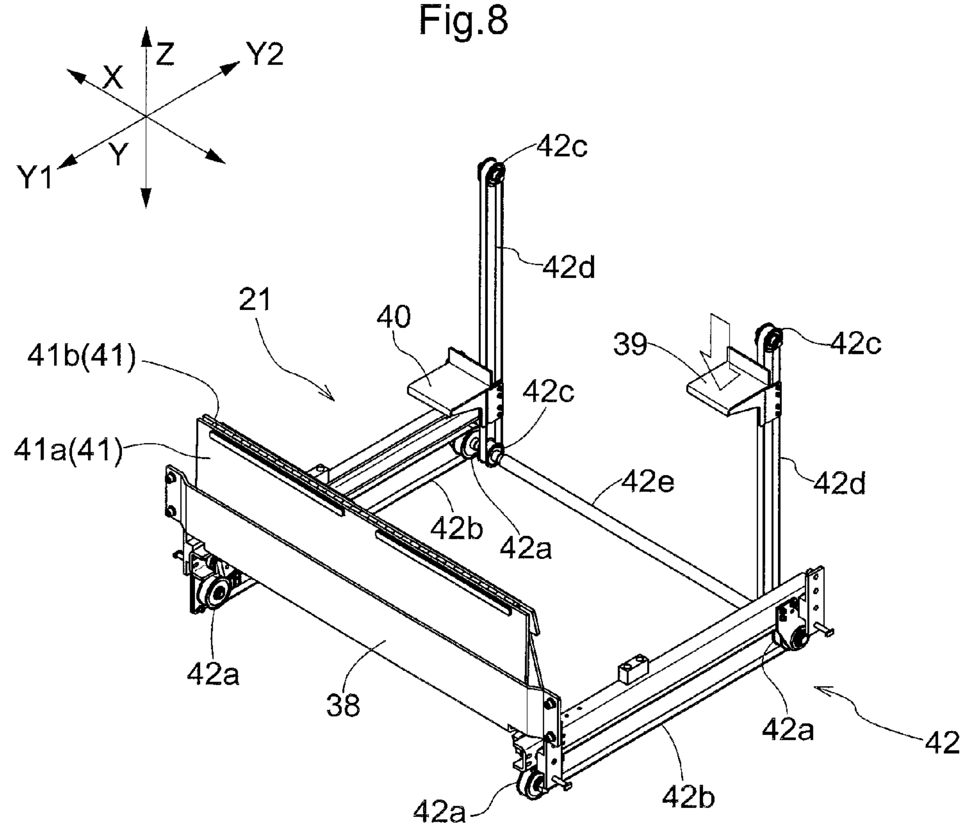
FIG. 8 is a perspective view showing a platform portion of the first embodiment in a fifth attitude.
Figure 9:
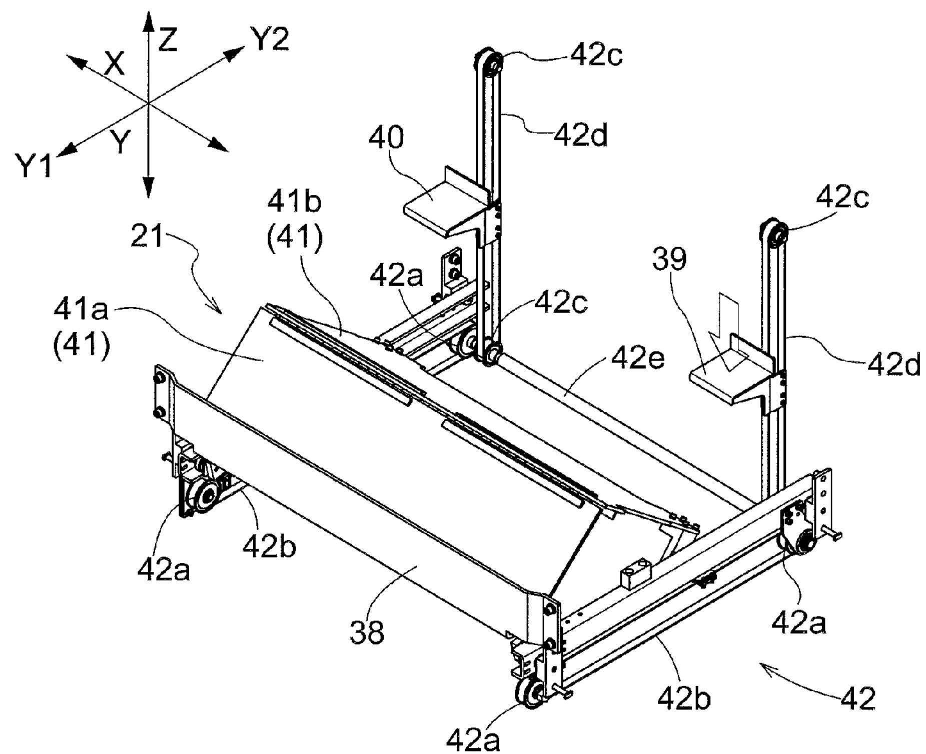
FIG. 9 is a perspective view showing the platform portion of the first embodiment in an intermediate attitude between the fifth attitude and a sixth attitude.
Figure 10:
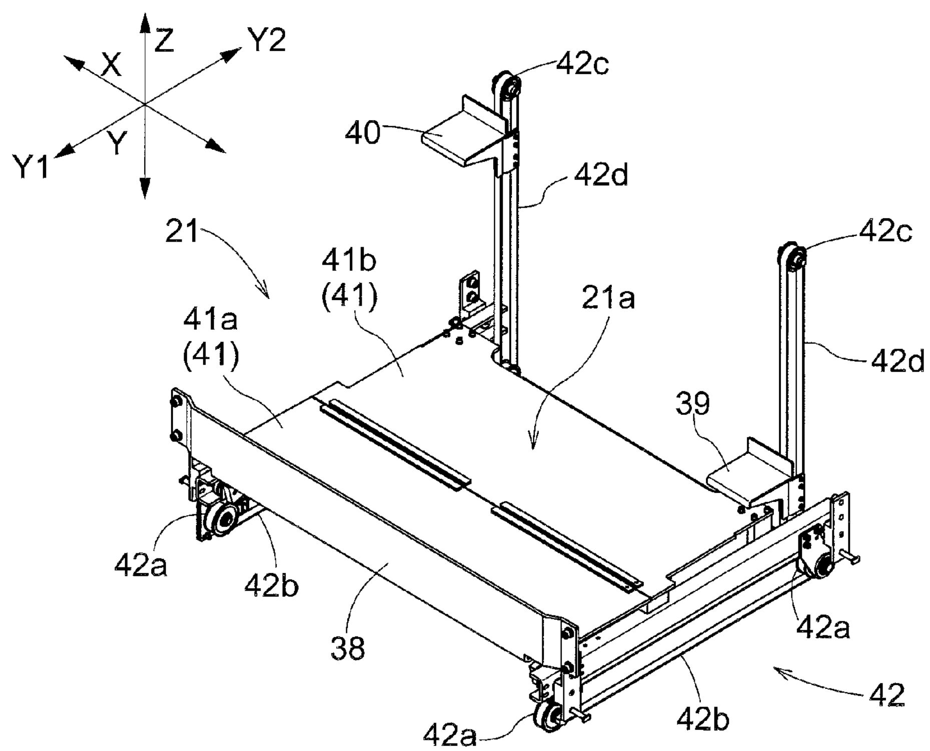
FIG. 10 is a perspective view showing the platform portion of the first embodiment in the sixth attitude.
Figure 11:
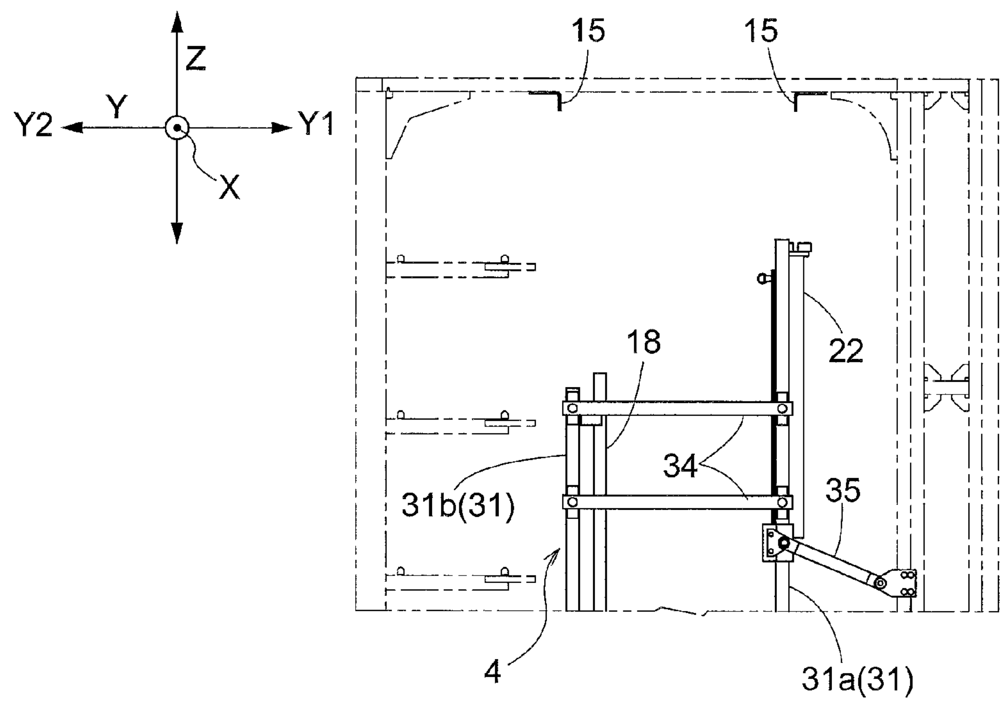
FIG. 11 is a front view showing an upper guided portion of the first embodiment in its lowered position.
Figure 12:
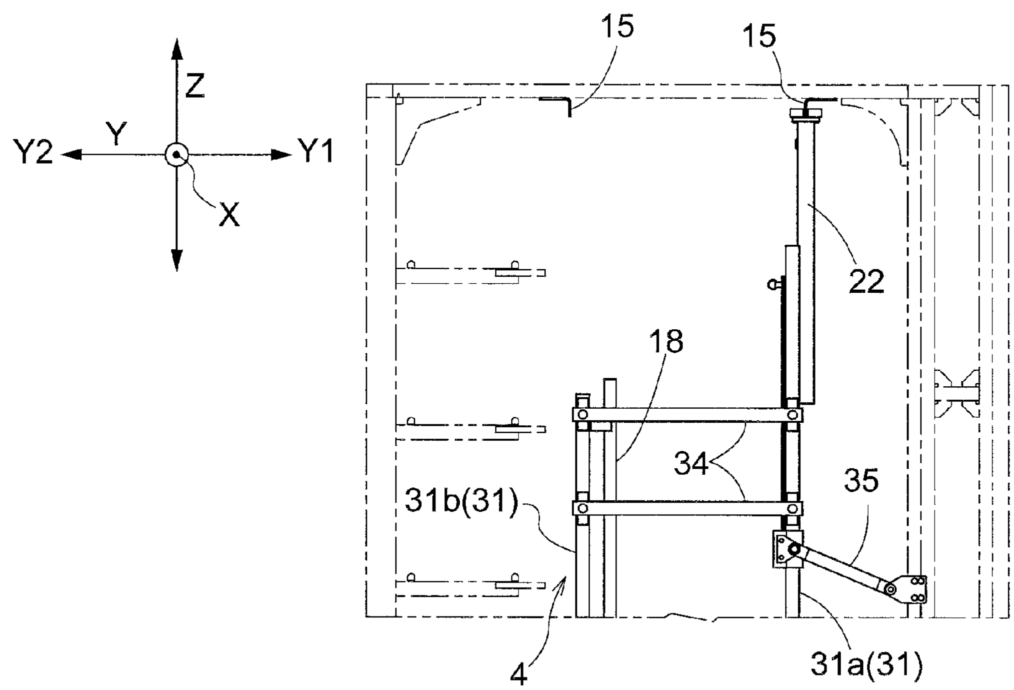
FIG. 12 is a front view showing the upper guided portion of the first embodiment in its raised position.
Figure 13:
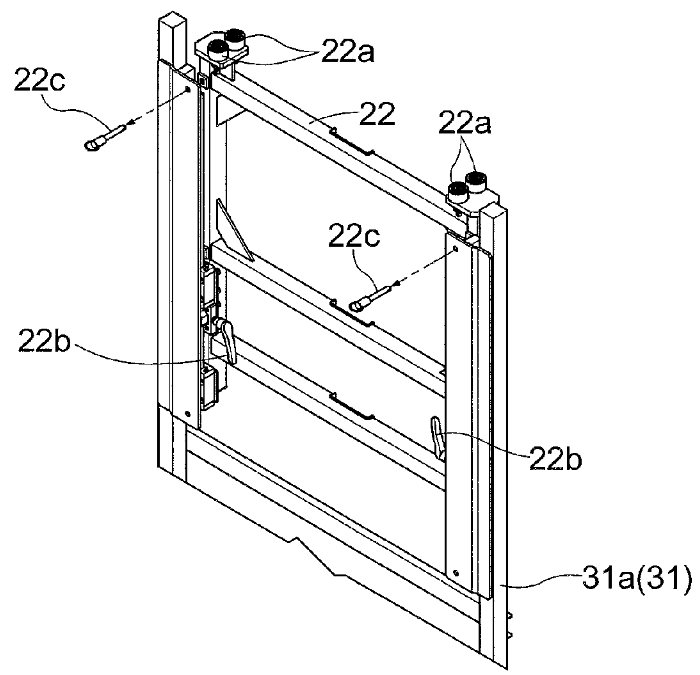
FIG. 13 is a perspective view showing the upper guided portion of the first embodiment of its lowered position.
Figure 14:
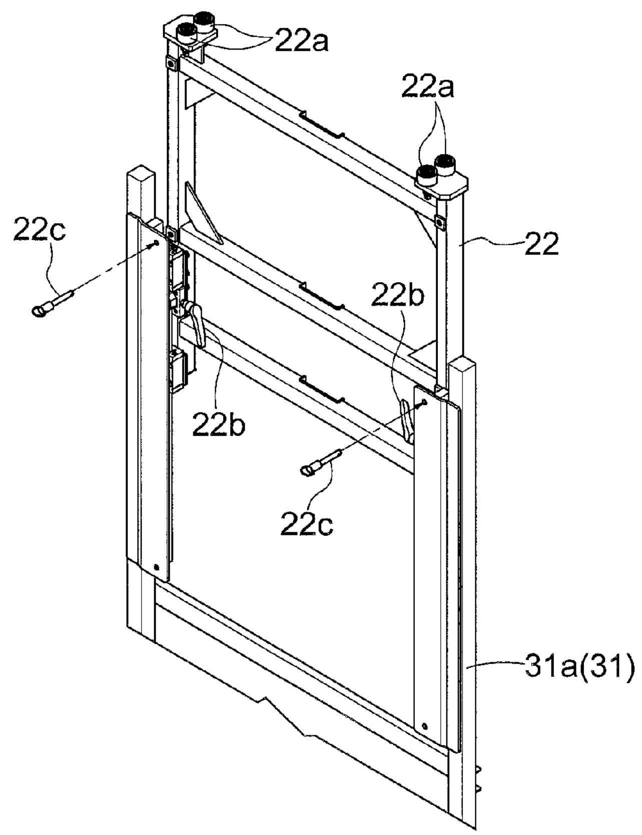
FIG. 14 is a perspective view showing the upper guided portion of the first embodiment in its raised position.

To describe the platform portions 21 in more detail, as shown in FIGS. 8-10, a plurality of platform portions 21 are installed along the vertical direction Z. Each platform portion 21 includes a base frame 38, a first step 39, a second step 40, a platform body 41 which forms the platform surface 21*a*, and an operatively connecting mechanism 42 which operatively connects the first step 39, the second step 40, and the platform body 41 to each other. The end portion, on the first direction Y1 side, of the base frame 38 is connected to the first platform mast 31*a* to be pivotable about the axis extending along the rack lateral direction X whereas the end portion, on the second direction Y2 side, of the base frame 38 is connected to the second platform mast 31*b* to be pivotable about the axis extending along the rack lateral direction X. The base frame 38 is configured such that its attitude is changed, in a manner similar to how the attitudes of the carriage portion 19 and the connecting members 34 are changed, as the carriage portion 19 is changed or moved to its third attitude and to its fourth attitude.

The operatively connecting mechanism 42 includes first belts 42*b* each of which runs over a pair of fore-and-aft-spaced-apart pulleys (sprockets) 42*a* which are spaced apart from each other along the rack fore and aft direction Y, second belts 42*d* each of which runs over a pair of vertically-spaced-apart pulleys (sprockets) 42*c* that are spaced apart from each other along the vertical direction Z, and a coupling bar 42*e* that is rotated integrally with the fore-and-aft-spaced-apart pulley 42*a* (of each pair of fore-and-aft-spaced-apart pulleys 42*a*) that is located on the first direction Y1 side and the vertically-spaced-apart pulley 42*c* (of each pair of vertically-spaced-apart pulleys 42*c*) that is located at the lower position than the other. Note that a pair of first belts 42*b* and a pair of the second belts 42*d* are provided. In addition, both pairs of fore-and-aft-spaced-apart pulleys 42*a* are rotatably supported by the base frame 38. The lower ones of the vertically-spaced-apart pulleys 42*c* are supported by the coupling bar 42*e*. And the upper ones of the vertically-spaced-apart pulleys 42*c* are rotatably supported by the first platform mast 31*a*.

The first step 39 is connected to one of the pair of second belts 42*d* whereas the second step 40 is connected to the other of the pair of second belts 42*d*. In addition, the first step 39 is connected to a portion, on the first direction Y1 side, of the corresponding second belt 42*d* which forms a loop whereas the second step 40 is connected to a portion, on the second direction Y2 side, of the corresponding second belt 42*d* which forms a loop. Thus, the second step 40 is moved upward by moving the first step 39 downward, and the first step 39 is moved upward by moving the second step 40 downward.

The platform body 41 includes a first portion 41*a* located on the first direction Y1 side, and a second portion 41*b* located on the second direction Y2 side. The end portion, on the second direction Y2 side, of the first portion 41*a* and the end portion, on the first direction Y1 side, of the second portion 41*b* are connected to each other to be pivotable relative to each other about an axis extending along the rack lateral direction X. In addition, the end portion, on the first direction Y1 side, of the first portion 41*a* is connected to the base frame 38 to be pivotable about an axis extending along the rack lateral direction X. In addition, the end portion, on the second direction Y2 side, of the second portion 41*b* is connected to the first belts 42*b* to be pivotable about axis extending along the rack lateral direction X. And by moving the second step 40 downward when the platform portion 21 is in the sixth state, the end portion, on the second direction Y2 side, of the platform body 41, is moved in the first direction Y1, which causes the platform body 41 to be folded such that the connecting location between the first portion 41*a* and the second portion 41*b* is lifted upward, which places the platform portion 21 in the fifth state (FIG. 10 to FIG. 8). In addition, by moving the first step 39 downward when the platform portion 21 is in the fifth state, the end portion, on the second direction Y2 side, of the platform body 41, is moved in the second direction Y2, which causes the platform body 41 to extend, or be unfolded, along the rack fore and aft direction Y such that the connecting location between the first portion 41*a* and the second portion 41*b* is pulled downward, which places the platform portion 21 in the sixth state (FIG. 8 to FIG. 10).

The procedure for using the work platform 4 is described next. As shown in FIG. 4, the work platform 4 is stored in the platform storage section 24 in the first state. In addition, when changing or moving the work platform 4 from the first state to the second state, the guide block 16 are moved in advance to the predetermined set positions (positions shown in FIG. 4) with respect to the platform storage section 24.

Figure 7:
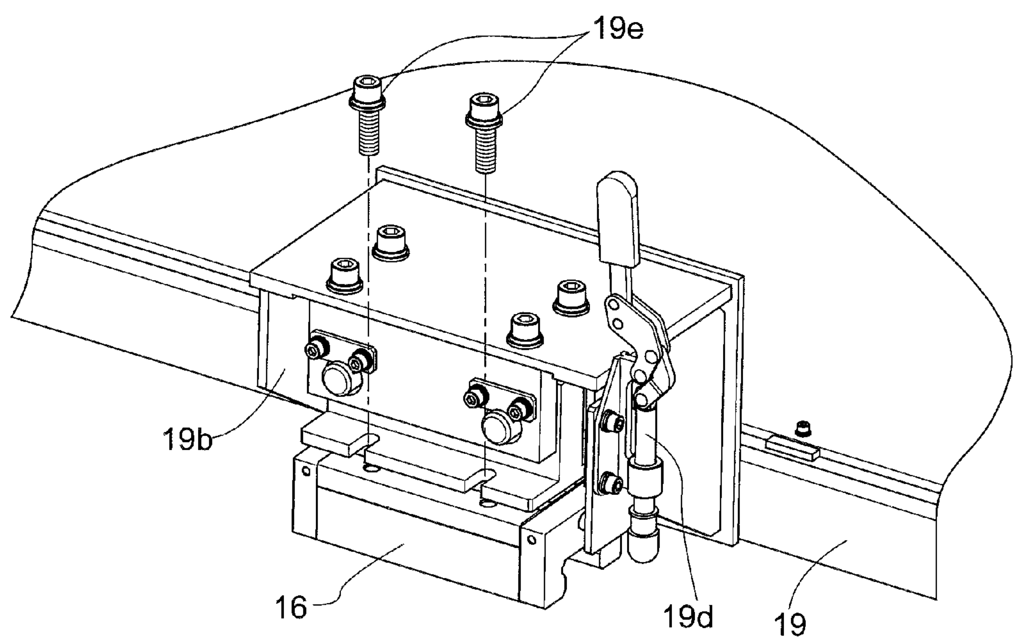
FIG. 7 is a perspective view showing a second connected portion and a guide block of the work platform of the first embodiment.
Figure 17:
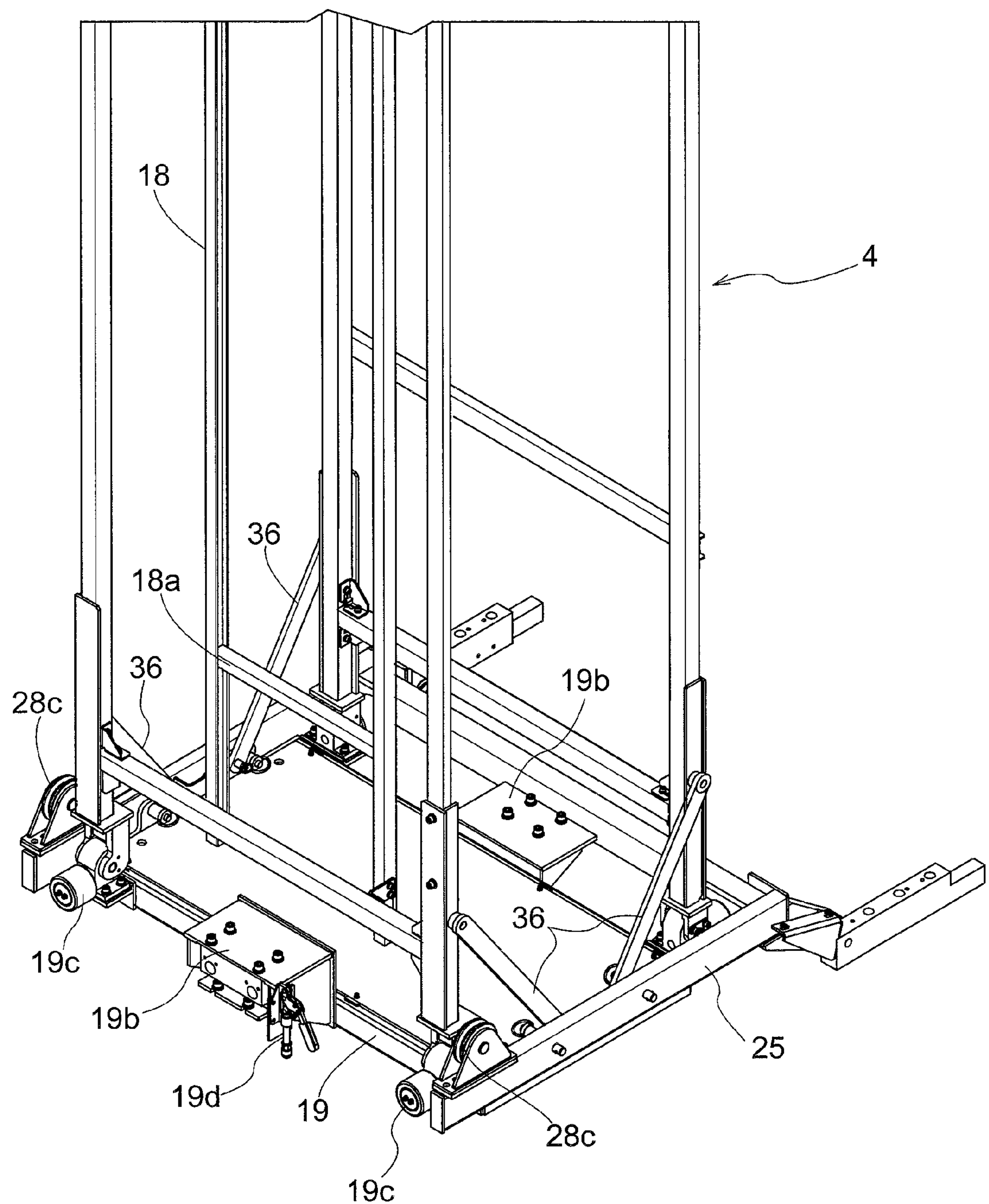
FIG. 17 is a perspective view showing a carriage portion of the first embodiment which is in a fourth attitude and to which first pivotable members are connected.

When changing or moving the work platform 4 from the first state to the second state, a worker rotates the winch 27 by a handle to feed out the wires 26 from the winch 27 and to change or move the first pivotable members 25 from the first attitude to the second attitude, which changes or moves the carriage portion 19 from the third attitude to the fourth attitude, as shown in FIGS. 5 and 6. By so changing or moving the carriage portion 19 to the fourth attitude, the ladder 18 is moved from the first position to the second position while the fall prevention portions 20 are moved from their third position to their fourth position. After so changing or moving the carriage portion 19 to the fourth attitude, the holding frames 36 are connected to the carriage portion 19, as shown in FIG. 6, to hold or maintain the work platform 4 in the second state. And as shown in FIG. 17, by switching the first fixing member 19*d* to its movement preventing state to restrict or prevent moment of the carriage portion 19 along the rack lateral direction X. As shown in FIG. 7, the guide blocks 16 are connected to the second connected portions 19*b* (connected portion) of the carriage portion 19.

Figure 15:
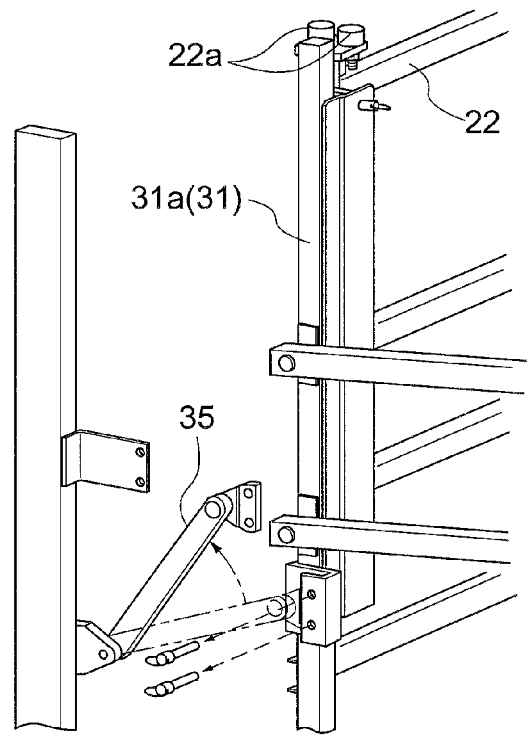
FIG. 15 is a perspective view of a second pivotable member of the first embodiment.
Figure 16:
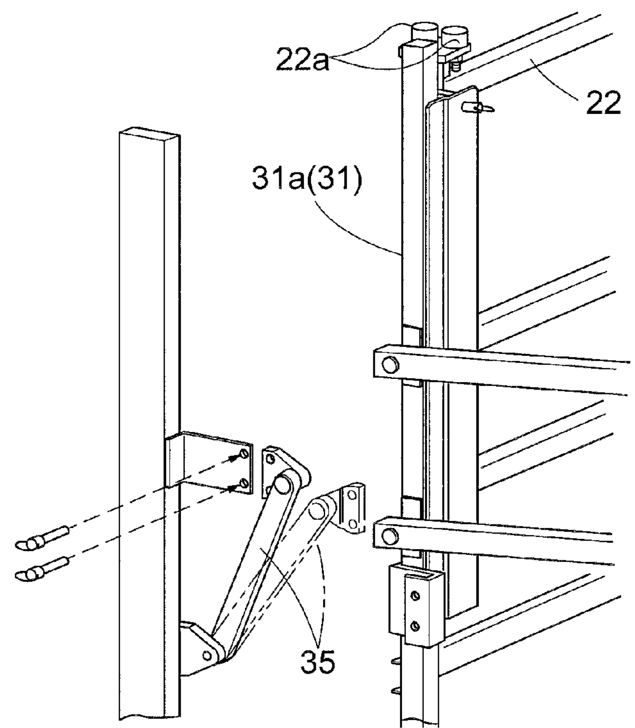
FIG. 16 is a perspective view of the second pivotable members of the first embodiment.

And a worker climbs up the ladder 18 and manually changes or moves the highest platform portion 21, among the plurality of platform portions 21, from the fifth state to the sixth state. A worker gets onto the platform portion 21 in sixth state, moves the upper guided portion 22 from its lowered position to the raised position, causes the second rail 15 to engage the upper guided portion 22, and subsequently, releases (the fixing of) the second pivotable members 35 from the platform mast 31. As shown in FIGS. 15 and 16, the second pivotable members 35 disengaged from the platform mast 31 are connected to frame members of the platform storage section 24. Subsequently, the worker changes or moves the highest platform portion 21 from the sixth attitude to the fifth attitude, descends down the ladder 18, and operates the winch 27 to place the first pivotable members 25 in the first attitude after releasing the first pivotable members 25 from the carriage portion 19.

Second Embodiment

The second embodiment of the article storage facility is described next with reference to the drawings. The following description of the second embodiment focuses on those features and structures that are different from those of the first embodiment, with the features and structures that are identical to those of the first embodiment omitted for brevity.

Figure 19:
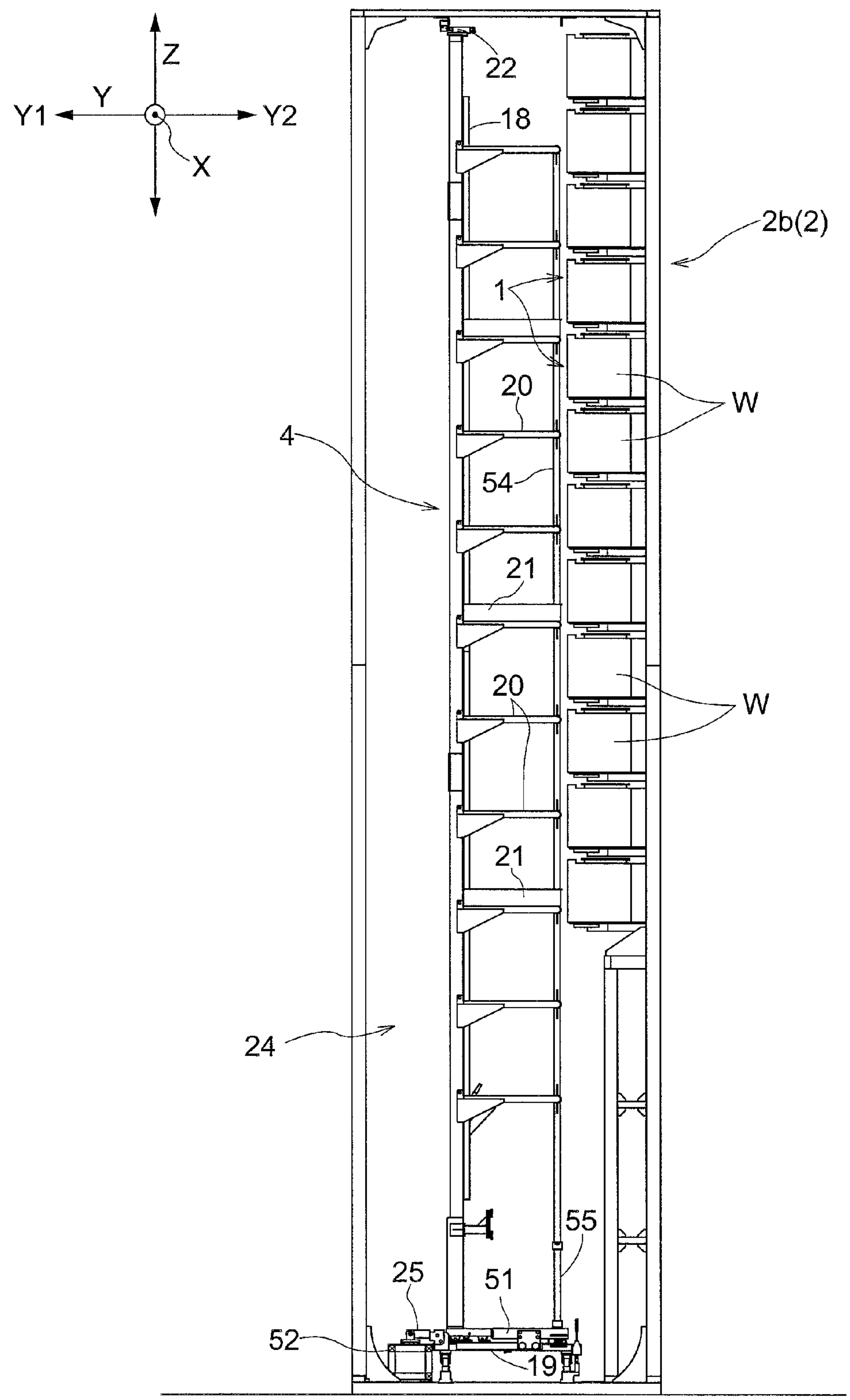
FIG. 19 is a front view of an article storage facility showing the article storage rack of the second embodiment and the work platform in the second state.
Figure 20:
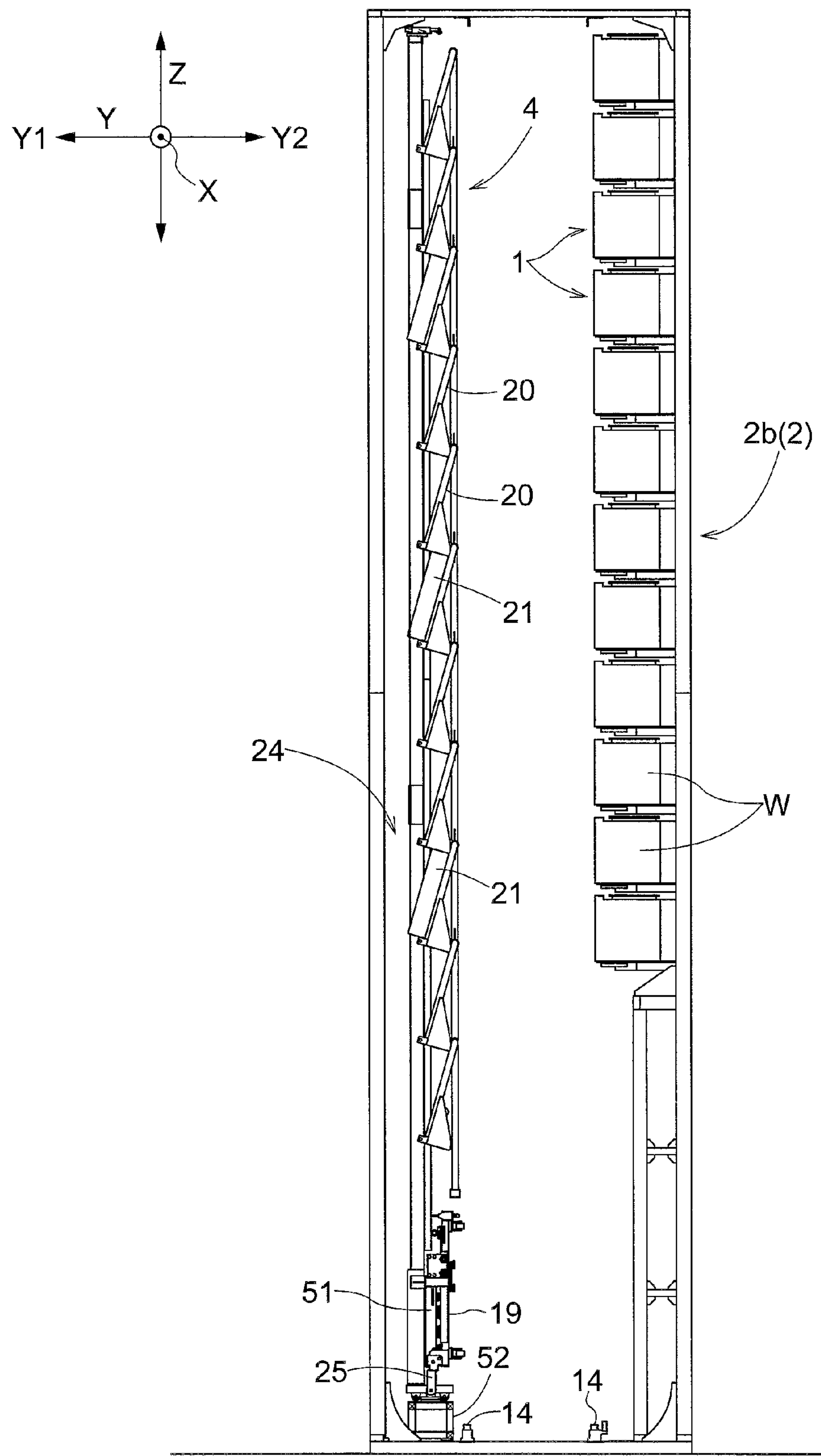
FIG. 20 is a front view of an article storage facility showing the article storage rack of the second embodiment and the work platform in the first state.
Figure 30:
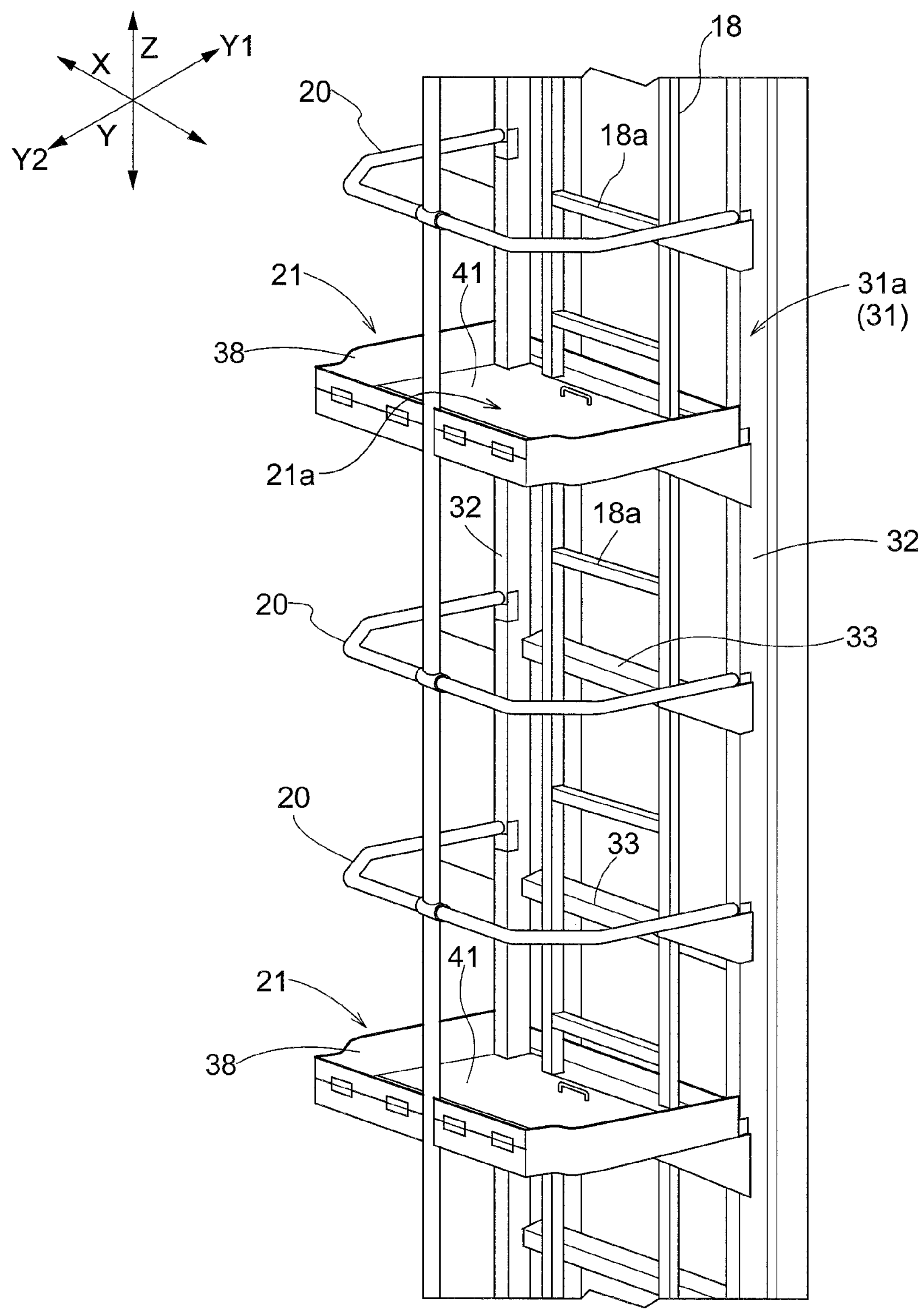
FIG. 30 is a perspective view of a principal portion of the work platform of the second embodiment in its second state.

As shown in FIGS. 19, 20, and 30, the work platform 4 includes a ladder 18 which a worker climbs up and down, a carriage portion 19 which supports the ladder 18 and is movable along the rack lateral direction X, a plurality of fall prevention portions 20 spaced apart from each other along the vertical direction Z for preventing workers from falling, a plurality of platform portions 21 each of which a worker can get onto, an upper guided portion 22 guided along the rack lateral direction X by a second rail 15, and a secondary carriage portion 51. As shown in FIGS. 22-26, the secondary carriage portion 51 is configured to be moved along the rack fore and aft direction Y to a position on a fixed support 52 provided to the platform storage section 24 and to a position on the carriage portion 19 in the fourth attitude. More specifically, the secondary carriage portion 51 is movable along the rack fore and aft direction Y to a state in which it is supported by the fixed support 52 and the carriage portion 19 in the fourth attitude, and to a state in which it is supported by only the carriage portion 19 in the fourth attitude. Note that neither the winch 27 provided to one end portion of the second storage rack 2*b* in the first embodiment, nor the wires 26 for suspending and supporting the first pivotable members 25 are provided in the second embodiment. Instead, a worker directly pivots the carriage portion 19.

The secondary carriage portion 51 is formed by, and consists of, the first carriage 51*a* and the second carriage 51*b*. The second carriage 51*b* is connected to the first carriage 51*a* to be pivotable about and axis extending along the rack lateral direction X. And the pivot axis about which the second carriage 51*b* is pivoted is located in a central portion, along the rack fore and aft direction Y, of the first carriage 51*a*. The second carriage 51*b* is configured to be changed or moved, by being pivoted about the pivot axis, to a lowered attitude (attitude shown in FIG. 24) in which the second carriage 51*b* is adjacent to the first carriage 51*a* along the rack fore and aft direction Y and is supported by the carriage portion 19, and to a standing attitude (attitude shown in FIG. 22 and FIG. 23) in which the second carriage 51*b* has been pivoted upward from the lowered attitude and is located within the width, along the rack fore-and-aft direction, of the first carriage 51*a*. And by placing the second carriage 51*b* in the standing attitude, the secondary carriage portion 51 is placed in the third state in which it is reduced in dimension along the rack fore and aft direction Y whereas, by placing the second carriage 51*b* in the lowered attitude, the secondary carriage portion 51 is placed in the fourth state in which it is increased in dimension along the rack fore and aft direction Y. As such, the secondary carriage portion 51 is configured to be capable of being increased and reduced in dimension along the rack fore and aft direction, to the third state in which it is reduced in dimension along the rack fore and aft direction Y, and to the fourth state in which it is increased in dimension along the rack fore and aft direction.

With the secondary carriage portion 51 changed to the third state and with the first carriage 51*a* of the secondary carriage portion 51 located on the fixed support 52, the secondary carriage portion 51 is said to be in a seventh position (position shown in FIGS. 21 and 22) at which the secondary carriage portion 51 is located on the first direction Y1 side with respect to the trajectory T. With the secondary carriage portion 51 moved in the second direction Y2 after the secondary carriage portion 51 has been changed or moved to the fourth state so that both the first carriage 51*a* and the second carriage 51*b* of the secondary carriage portion 51 are located on the carriage portion 19, the secondary carriage portion 51 is said to be in an eighth position (position shown in FIG. 26) at which the secondary carriage portion 51 overlaps with the trajectory T. With the secondary carriage portion 51 (the first carriage 51*a* and the second carriage 51*b*) in the eighth position as described above, each first connecting portion 19*f* of the carriage portion 19 can be fixed to a corresponding third connected portion 51*c* of the second carriage 51*b* of the secondary carriage portion 51, by means of one or more third fixing members (not shown).

Figure 23:
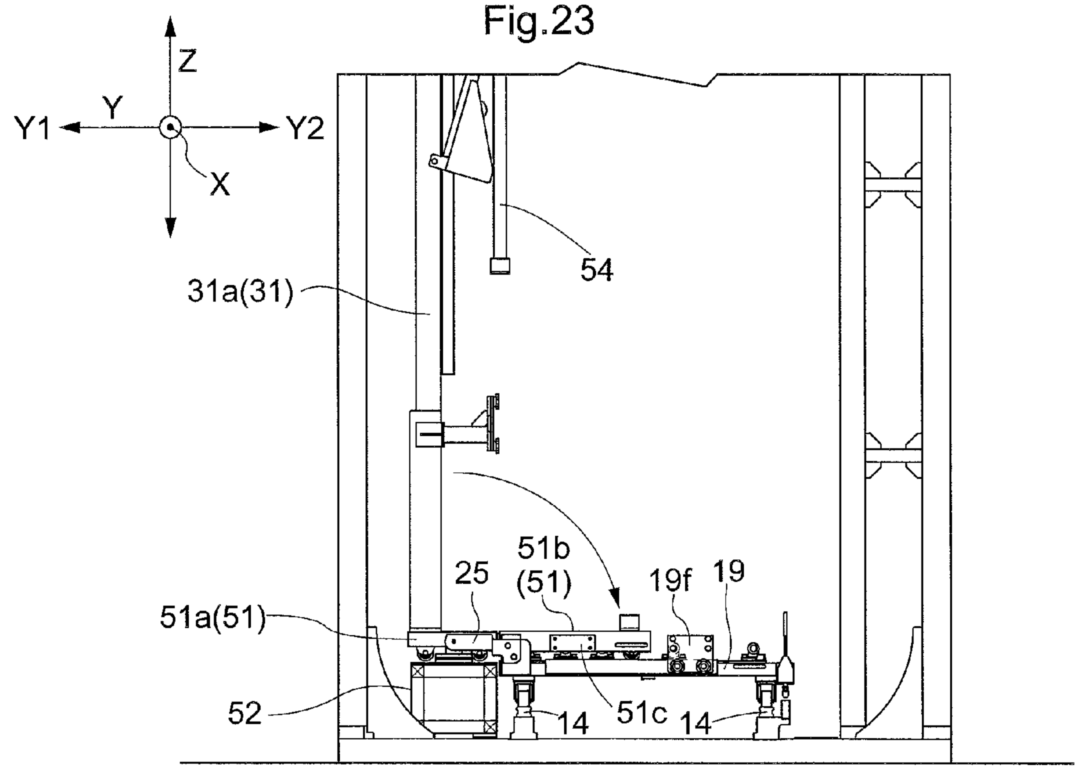
FIG. 23 is a front view showing a secondary carriage portion of the second embodiment after it has been moved to its fourth state.
Figure 24:
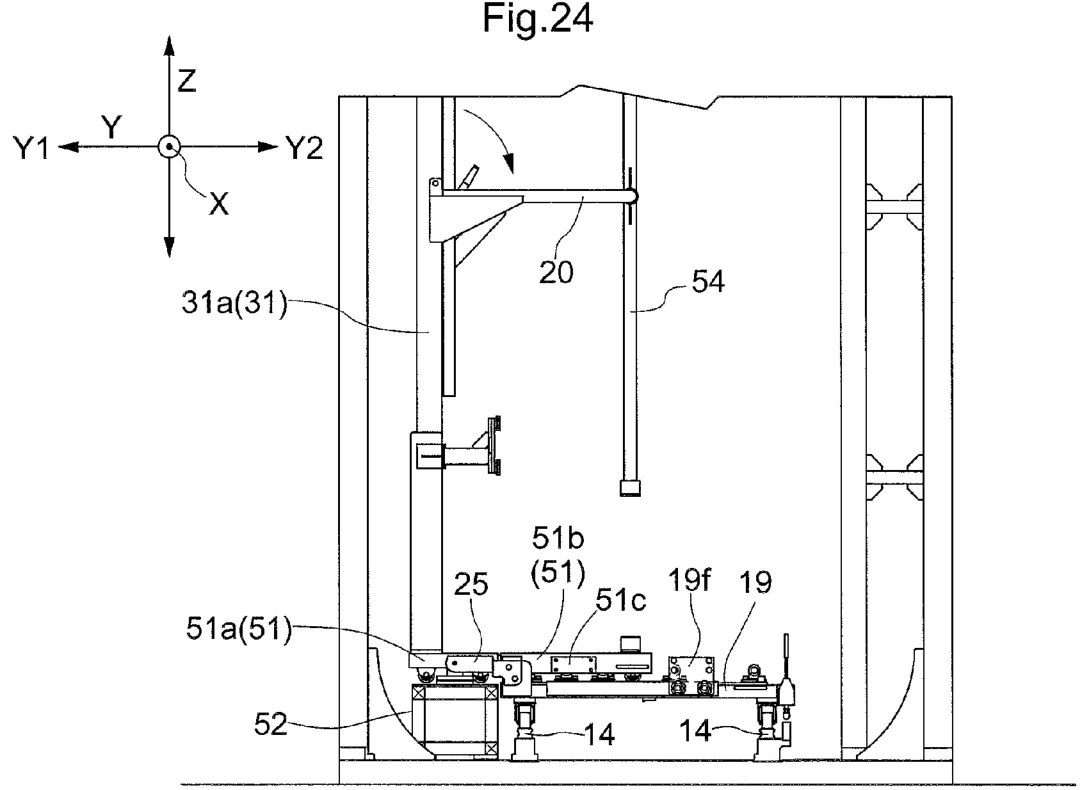
FIG. 24 is a front view showing one of a plurality of fall prevention portions of the second embodiment after it has been moved to its sixth position.
Figure 25:
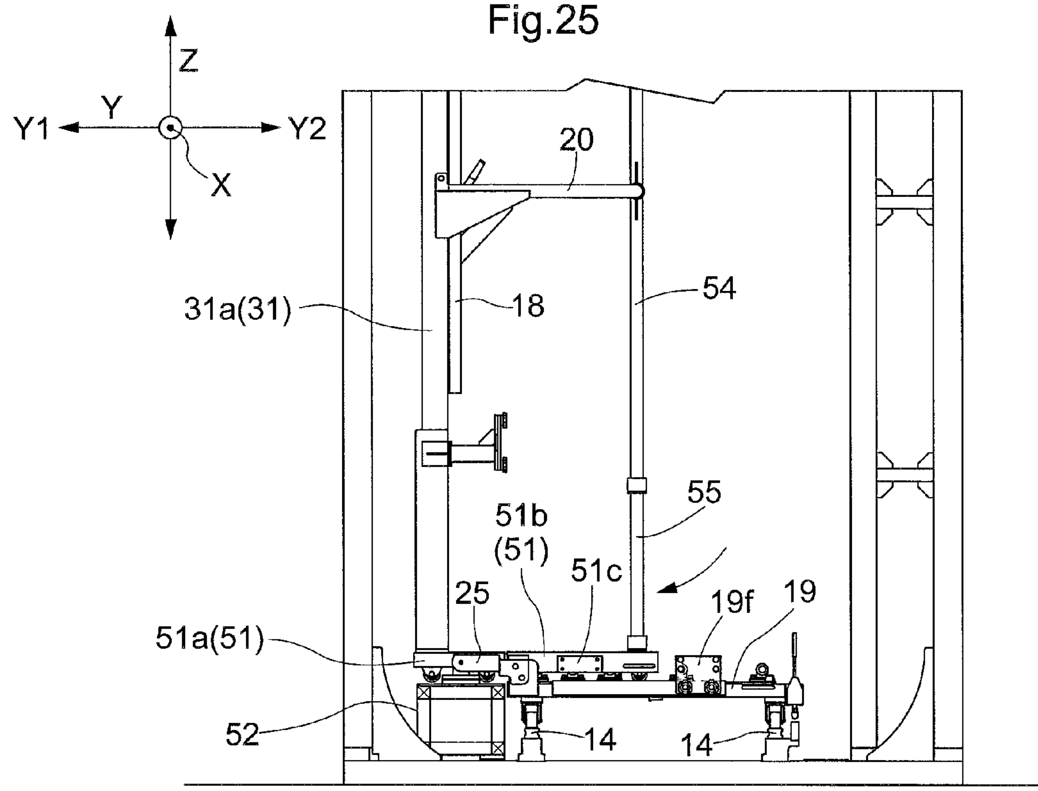
FIG. 25 is a front view showing one of the plurality of fall prevention portions of the second embodiment being connected to the secondary carriage portion by means of a connecting mechanism.
Figure 26:
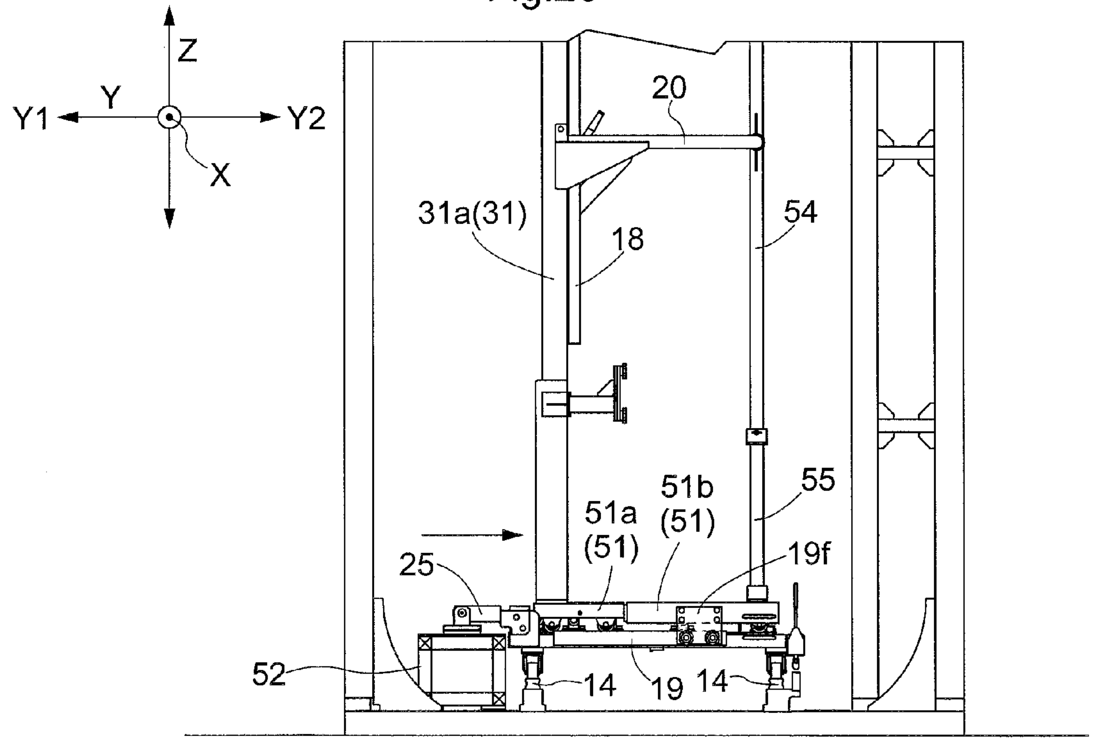
FIG. 26 is a front view showing the secondary carriage portion of the second embodiment after it has been moved to its eighth position.

The work platform 4 has only the first platform mast 31*a* as the platform mast 31. And the first platform mast 31*a* is disposed vertically on and is fixed to the first carriage 51*a* of the secondary carriage portion 51 such that its attitude with respect to the first carriage 51*a* is fixed. As shown in FIGS. 23-25, when the secondary carriage portion 51 is in the seventh position, the first platform mast 31*a* is located on the first direction Y1 side with respect to the trajectory T. And as shown in FIG. 26, when the secondary carriage portion 51 is in the eighth position, the first platform mast 31*a* is in a position at which it overlaps with the trajectory T.

A ladder 18 is fixed to horizontal frames 33 of the first platform mast 31*a*. As such, the ladder 18 is fixed to the secondary carriage portion 51 through the first platform mast 31*a*. As shown in FIGS. 23-26, the ladder 18 is moved to a position in which it is retracted to the first direction Y1 side with respect to the trajectory T and to a position in which it overlaps with the trajectory T, with and by the movement of the secondary carriage portion 51 along the rack fore and aft direction Y. In addition, the ladder 18 is located on the first direction Y1 side of the central portion of the work platform 4 along rack fore and aft direction Y when the work platform 4 has been changed or moved to, and is in, the second state.

Each of the plurality of fall prevention portions 20 is formed to have a U-shape that opens toward the first direction Y1 as seen along the vertical direction. And the base portion of each fall prevention portion 20 is connected to the first platform mast 31*a* to be pivotable about an axis extending along the rack lateral direction X. And each of the plurality of fall prevention portions 20 is configured to be movable to a sixth position (position shown in FIG. 19) in which a part of the fall prevention portion 20 is located on the second direction Y2 side with respect to the ascending and descending area for a worker who uses, and climbs up and down, the ladder 18 on the second direction Y2 side thereof, and a fifth position (position shown in FIG. 20) in which the fall prevention portion 20 has been pivoted upward and is closer to the ladder 18 along the rack fore and aft direction Y than in the sixth position. A connecting portion 54 is connected to a distal end portion of each of the plurality of fall prevention portions 20 so that the plurality of fall prevention portions 20 are configured to be moved to the fifth position and to the sixth position integrally and in unison.

A pivotable portion 55 is provided to (or can be pivotably connected to) a lower end portion of the connecting portion 54 so that the plurality of fall prevention portions 20 can be held in their sixth position by connecting the lower end portion of the connecting portion 54 to the second carriage 51*b* of the secondary carriage portion 51 with the plurality of fall prevention portions 20 in the fifth position. And the ascending and descending area, which is an extent of space through or in which the worker can use, and climb up and down, the ladder 18, is formed between the plurality of fall prevention portions 20 in the sixth position and the ladder 18. As such, the work platform 4 is configured such that the plurality of fall prevention portions 20 can be held or maintained in the sixth position by fixing the connecting portion 54 to the secondary carriage portion 51 with secondary carriage portion 51 in the fourth state and the plurality of fall prevention portions 20 in the sixth position. Note that the pivotable portion 55 is, or corresponds to, the holding mechanism.

The upper guided portion 22 includes a first support member 57 which supports second guide rollers 56, a second support member 58 which supports the first support member 57 for movement along the rack fore and aft direction Y, and a resilient member 59 formed by a tension coil spring which urges the first support member 57 in the second direction Y2 with respect to the second support member 58. The second support member 58 is fixed to the upper end portion of the first platform mast 31*a*. And as the secondary carriage portion 51 is moved from the seventh position to the eighth position, the second guide roller 56 comes into contact with a second rail 15 from the first direction Y1 side; and, then the second guide roller 56 is pressed against the second rail 15 by the urging force of the resilient member 59. The upper guided portion 22 is configured to guide the work platform 4 along the rack lateral direction X while restricting movement along the rack fore and aft direction Y (especially movement in the second direction Y2) of the work platform 4, as a result of the fact that the second guide roller 56 is in contact with the second rail 15 from the first direction Y1 side.

The work platform 4 includes platform portions 21 each of which a worker can get onto, on the second direction Y2 side (vertical movement side) with respect to the ladder 18. Each platform portion 21 has a platform surface 21*a* which a worker can get onto. The platform portion 21 is configured to be capable of being changed or moved to a fifth state and to a sixth state. The fifth state is a state of the work platform 4 in which the platform surface 21*a* extends generally along the vertical direction Z and the rack fore and aft direction Y and in which the platform surface 21*a* is located on the second direction Y2 side with respect to an ascending and descending area which is an extent of space through or in which a worker uses, and climbs up and down, the ladder 18 (i.e, on the side opposite from the side the ladder 18 is located with respect to the vertical space). The sixth state is a state of the work platform 4 in which the platform surface 21*a* extends along the rack lateral direction X and the rack fore and aft direction Y and in which the platform portion 21 overlaps with the ascending and descending area.

To describe the platform portions 21 in more detail, two or more platform portions 21 are installed along the vertical direction Z. Each platform portion 21 includes a base frame 38, and a platform body 41 which forms the platform surface 21*a*. The end portion, on the first direction Y1 side, of the base frame 38 is connected to the first platform mast 31*a* to be pivotable about an axis extending along the rack lateral direction X whereas the end portion, on the second direction Y2 side, of the base frame 38 is connected to the connecting portion 54 to be pivotable about an axis extending along the rack lateral direction X. Each base frame 38 is configured such that its attitude is changed as the plurality of fall prevention portions 20 are changed or moved to the fifth position and to the sixth position, in a manner similar to how the attitudes of the plurality of fall prevention portions 20 are changed. The end portion, on the second direction Y2 side, of each platform body 41 is connected to the base frame 38 to be pivotable about an axis extending along the rack lateral direction X. And the platform body 41 can be changed to the fifth state by pivoting it upward from the sixth state whereas the platform body 41 can be changed to the sixth state by pivoting it downward from the fifth state The procedure for using the work platform 4 is described next. As shown in FIG. 20, the work platform 4 is stored in the platform storage section 24 in the first state. In addition, when changing or moving the work platform 4 from the first state to the second state, the guide block 16 are moved in advance to the predetermined set positions with respect to the platform storage section 24.

Figure 21:
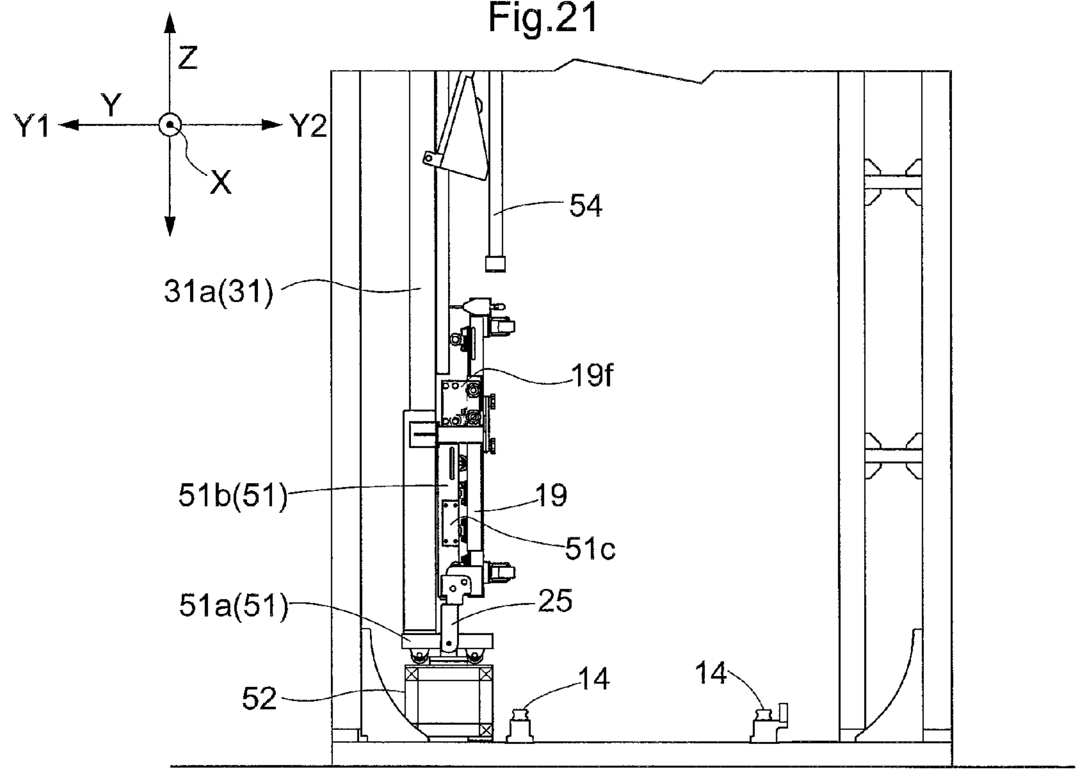
FIG. 21 is a front view showing a lower portion of the work platform of the second embodiment in the first state.
Figure 22:
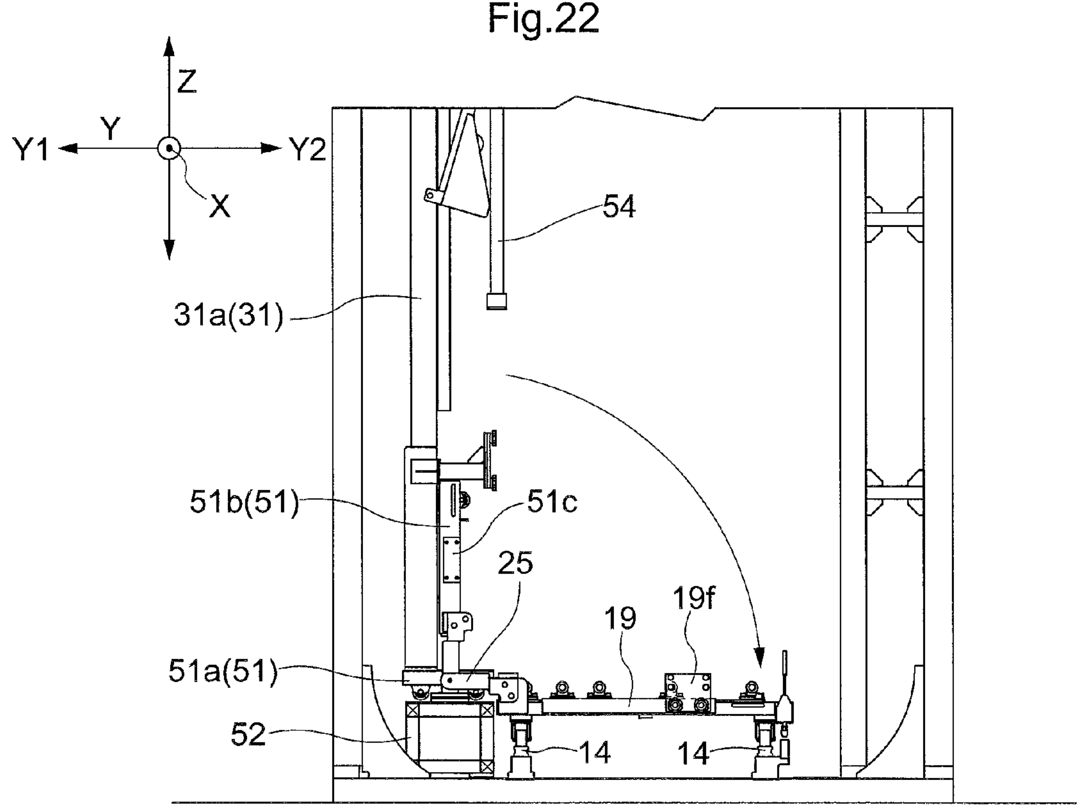
FIG. 22 is a front view showing the carriage portion of the second embodiment after it has been moved to its fourth attitude.
Figure 27:
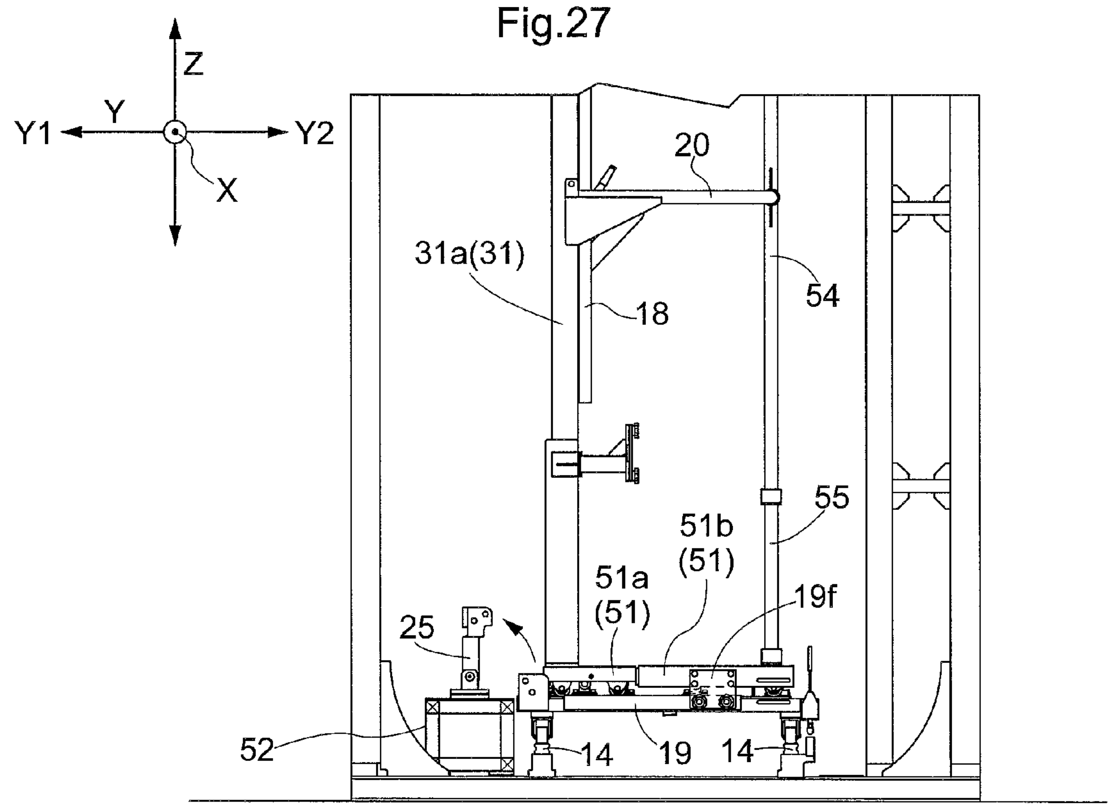
FIG. 27 is a front view showing the carriage portion of the second embodiment when it is released from the first linking member.
Figure 28:
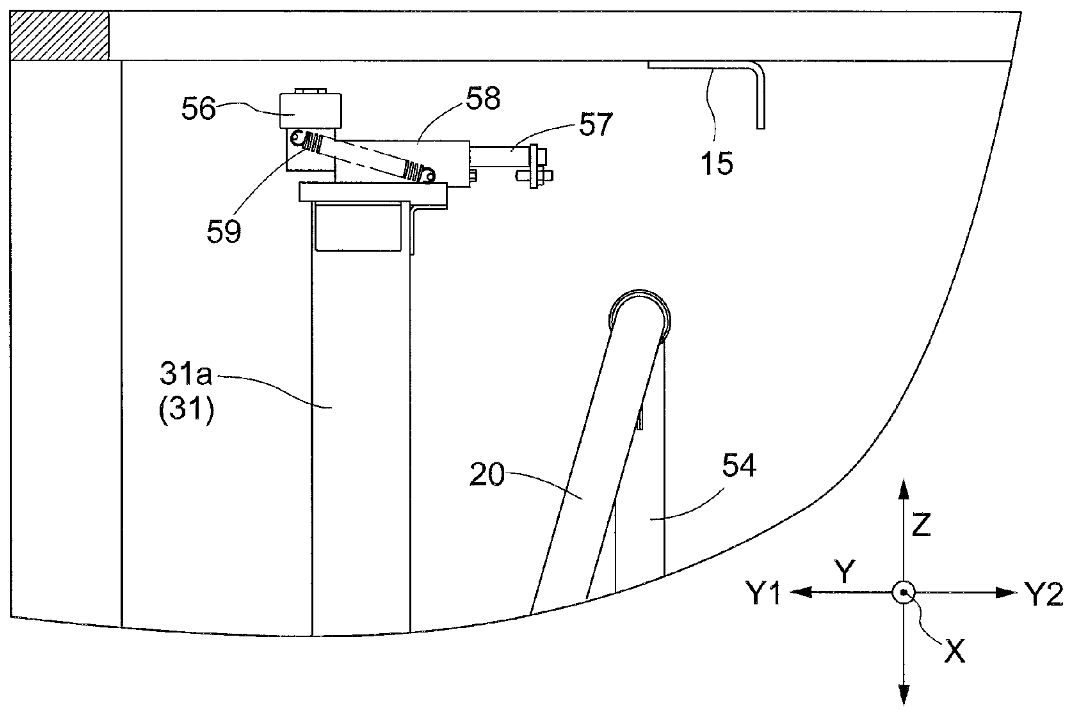
FIG. 28 is a front view showing an upper guided portion of the second embodiment.
Figure 29:
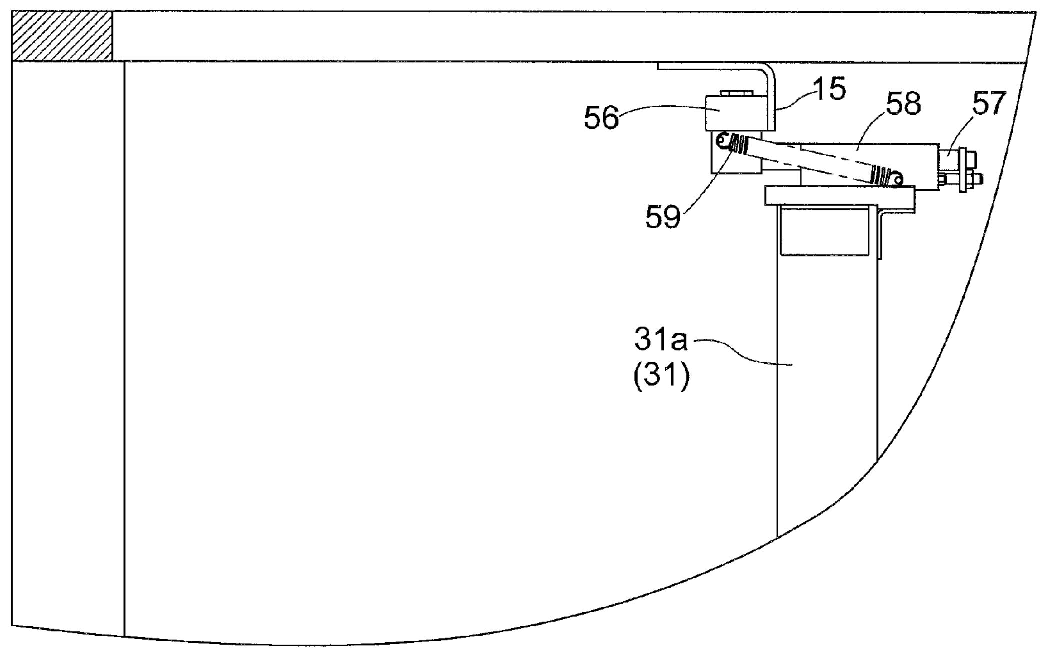
FIG. 29 is a front view showing an upper guided portion of the second embodiment.

As shown in FIGS. 21 and 22, when changing or moving the work platform 4 from the first state to the second state, a worker manually and directly moves the carriage portion 19 to change its attitude from the third attitude to the fourth attitude. After changing or moving the carriage portion 19 to its fourth attitude, the secondary carriage portion 51 is switched or moved from the third state to the fourth state first as shown in FIGS. 23 and 24. Next, the plurality of fall prevention portions 20 are moved from their fifth position to their sixth position. Subsequently, as shown in FIG. 25, the pivotable portion 55 is connected to the secondary carriage portion 51 to hold or maintain the plurality of fall prevention portions 20 in their sixth position. And as shown in FIGS. 25 and 26, the secondary carriage portion 51 is moved from the seventh position to the eighth position. And the secondary carriage portion 51 is fixed to the carriage portion 19 with the secondary carriage portion 51 in the eighth position. Note that by moving the secondary carriage portion 51 from the seventh position to the eighth position, the upper guided portion 22 is placed in a position where it is guided by the second rail 15. And as shown in FIG. 27, after releasing a first pivotable member 25 from the carriage portion 19, the worker manually and directly moves the first pivotable member 25 to its first attitude.

Alternative Embodiments (1) In the first and second embodiments described above, the carriage portion 19 is pivoted about an axis extending along the rack lateral direction X to change its attitude to the third attitude and to its fourth attitude, and to increase and reduce its dimension along the rack fore and aft direction Y. However, the carriage portion 19 may be constructed such that its dimension along the rack fore and aft direction Y is increased and reduced by forming the carriage portion 19 with a first carriage portion and a second carriage portion, and by allowing the first carriage portion to slide with respect to the second carriage portion along the rack fore and aft direction.

(2) In the first and second embodiments described above, the guide portions are provided such that they are already in engagement with respective travel rails and such that the carriage portion 19 are connected to the guide portions after changing or moving the carriage portion 19 from the third attitude to the fourth attitude. However, the guide portions may be configured such that they are already connected to the carriage portion 19 and such that they come into engagement with respective travel rails as the carriage portion 19 is changed or moved from the third attitude to the fourth attitude.

(3) In the first and second embodiments described above, the work platform 4 is configured such that it can be changed or moved to its first state and to its second state so that the work platform 4 in the first state can be stored in the platform storage section 24. However, the work platform 4 may be configured such that it cannot be changed or moved from the second state to the first state and such that the work platform 4 is stored in the platform storage section 24 in the second state.

(4) In the first embodiment described above, the pivoting of the carriage portion 19, the movement of the ladder 18, and the movement of the fall prevention portions 20 are operatively connected. However, one or both of the ladder 18 and the fall prevention portions 20 may be configured to be moved independently without being operatively connected to the carriage portion 19.

(5) In the first and second embodiments described above, the platform portions 21 and the fall prevention portions 20 are provided; however, it is not necessary to provide one or both of these platform portions 21 and the fall prevention portions 20.

The article storage facility described above is briefly summarized next.

In one embodiment, an article storage facility comprises: article storage racks each having a plurality of article storage sections for storing articles, with article storage sections arranged one above another along a vertical direction and one next to another along a rack lateral direction, with the vertical direction being defined to be an up-and-down direction, the rack lateral direction being defined to be one direction that is perpendicular to the vertical direction, and a rack fore and aft direction being defined to be a direction that is perpendicular to the vertical direction and the rack lateral direction; an article transport device which is capable of transferring an article between the article transport device and any of the plurality of article storage sections, and which is configured to move along a travel path formed along the rack lateral direction to transport an article; a work platform which a worker can get onto, the work platform being capable of being moved along the travel path and having a ladder; wherein, with a first direction being defined to be one direction along the rack fore and aft direction, a second direction being defined to be a direction that is along the rack fore and aft direction and that is opposite from the one direction, the article storage racks include a pair of storage racks formed by a first storage rack installed on a first direction side with respect to the travel path, and a second storage rack installed on a second direction side with respect to the travel path, wherein the article storage racks include a platform storage section for storing the work platform on the first direction side with respect to a trajectory which is an extent of space which is used exclusively by the article transport device when the article transport device moves along the travel path, wherein the platform storage section and the trajectory overlap each other at least in part, as seen along the rack fore and aft direction, and wherein the platform storage section and the second storage rack overlap each other at least in part, as seen along the rack fore and aft direction.

With the arrangement described above, article storage sections can be provided also in the portion of second storage rack that overlaps with the platform storage section, for additional article storage sections for storing articles. In addition, since the platform storage section and the trajectory overlap with each other at least in part, as seen along the rack fore and aft direction, the article transport device can move along the travel path and transport articles to or from the article storage sections that overlap with the platform storage section as seen along the rack fore and aft direction. Note that the platform storage section may be provided to the first storage rack or may be located to one side, along the rack lateral direction, with respect to the first storage rack.

By disposing the platform storage section so as to overlap with the second storage rack as seen along the rack fore and aft direction in this manner, the storage efficiency of an article storage facility can be proved, compared with a case in which the platform storage section is located to one side, along the rack lateral direction, with respect to both of the storage racks, namely the first storage rack and the second storage rack.

Here, the work platform preferably includes a carriage portion which supports the ladder and which can be moved along the rack lateral direction, wherein the carriage portion is preferably configured such that dimension thereof along the rack fore and aft direction can be increased and reduced, wherein the work platform can be preferably changed to a first state in which the carriage portion is reduced in dimension along the rack fore and aft direction, and to a second state in which the carriage portion is increased in dimension along the rack fore and aft direction, wherein the work platform is preferably placed in the first state when stored in the platform storage section, and is placed in the second state when moved along the travel path and along the rack lateral direction.

With the arrangement described above, the work platform is stored in the platform storage section in the first state in which the carriage portion is reduced in dimension along the rack fore and aft direction (i.e., the dimension of the carriage portion along the rack fore and aft direction is reduced). Since the carriage portion is reduced in dimension along the rack fore and aft direction when the platform storage section is in the first state, the platform storage section may be made small in size along the rack fore and aft direction, compared with a case in which the work platform is stored in the platform storage section with the carriage portion in the state in which its dimension along the rack fore and aft direction is not reduced. In addition, when the work platform is moved along the travel path along the rack lateral direction, the work platform is in the second state in which the carriage portion is increased in dimension along the rack fore and aft direction. This makes it more difficult for the work platform fall over, and makes it easier to move the work platform along the rack lateral direction. As such, a work platform can be provided which can be moved easily along the rack fore and aft direction and which can be stored in a platform storage section that is small along the rack fore and aft direction.

In addition, the platform storage section preferably has a pivotable member which is pivotable about a pivot axis extending along the rack lateral direction and which can be connected to the carriage portion, wherein the pivot axis is preferably located on the first direction side with respect to the trajectory, wherein the pivotable member is preferably configured such that an attitude thereof can be changed, by pivoting the pivotable member, to a first attitude in which the pivotable member is located on the first direction side with respect to the trajectory, and to a second attitude in which the pivotable member has been pivoted from the first attitude toward the trajectory, wherein, when the pivotable member is in the first attitude with the pivotable member connected to the carriage portion, the carriage portion is preferably in a third attitude in which the carriage portion is located on the first direction side with respect to the trajectory, wherein, when the pivotable member is in the second attitude with the pivotable member connected to the carriage portion, the carriage portion is preferably in a forth attitude in which the carriage portion overlaps with the trajectory as seen along the vertical direction, as seen along the rack fore and aft direction, and as seen along the rack lateral direction, wherein, the carriage portion is preferably formed such that, in the fourth attitude, a dimension of the carriage portion along the vertical direction is less than a dimension of the carriage portion along the rack fore and aft direction, as seen along the rack lateral direction, wherein it is preferable that the dimension of the carriage portion along the rack fore and aft direction is increased when the carriage portion is moved from the third attitude to the fourth attitude whereas the dimension of the carriage portion along the rack fore and aft direction is reduced when the carriage portion is moved from the fourth attitude to the third attitude.

With the arrangement described above, both the changing of the state of the work platform and the moving of the carriage portion can be accomplished by changing the attitude of the carriage portion by directly moving the pivotable member or the carriage portion, with the pivotable member connected to the carriage portion. This facilitates the changing of the state of the work platform and the moving of the carriage portion, compared with a cased in which these tasks are performed independently and separately.

In addition, a guide portion for guiding the carriage portion along the travel path is preferably provided in the article storage facility, wherein the guide portion is preferably in engagement with a travel rail installed along the travel path, wherein the carriage portion preferably includes a connected portion which can be connected to the guide portion, wherein the connected portion is preferably located at such a position that the connected portion can be connected to the guide portion when the pivotable member connected to the carriage portion is in the second attitude and the carriage portion is in the fourth attitude.

When the carriage portion is in the fourth attitude, the work platform can be moved along the travel rail. With the arrangement described above, the carriage portion of the work platform can be easily connected to the guide portion engaged with the travel rail after changing or moving the carriage portion from the third attitude to the fourth attitude. In addition, the carriage portion can be moved stably along the travel rail because the carriage portion is connected to the guide portion engaged to the travel rail.

In addition, the work platform preferably has an operatively connecting portion which operatively connects the ladder and the carriage portion with each other, wherein, with a first position being defined to be a position on the first direction side with respect to the trajectory as seen along the rack lateral direction or along the vertical direction, and a second position being defined to be a position that overlaps with the trajectory, as seen along the rack lateral direction or along the vertical direction, the ladder is preferably in the second position when the work platform is in the second state, and wherein the operatively connecting portion preferably moves the ladder from the second position to the first position as the carriage portion is changed from the fourth attitude to the third attitude, and moves the ladder from the first position to the second position as the carriage portion is changed from the third attitude to the fourth attitude.

With the arrangement described above, when the carriage portion is in the first state, the ladder is located on the first direction side with respect to the trajectory; thus, the article transport device can move along the travel path without interfering with the ladder. In addition, since the operatively connecting portion operatively connects the ladder and the carriage portion with each other, both the state in which the carriage portion is in the third attitude and the ladder is in the first position and the state in which the carriage portion is in the fourth attitude and the ladder is in the second position can be obtained by either changing the state of the carriage portion or moving the ladder. As such, it is not necessary to move the ladder independently of the changing of the attitude of the carriage portion; thus, the time and effort to move the ladder can be saved.

In addition, the work platform preferably has a plurality of fall prevention portions that are spaced apart from each other along the vertical direction, wherein each of the plurality of fall prevention portions can preferably be moved between a third position and a fourth position, wherein the third position is preferably a position at which each fall prevention portion is closer to the ladder along the rack fore and aft direction than at the fourth position, wherein an ascending and descending area for a worker who uses and climbs up and down the ladder is preferably formed in a space surrounded by the ladder and the fall prevention portions when each of the plurality of fall prevention portions is in the fourth position, wherein the operatively connecting portion preferably operatively connects the plurality of fall prevention portions with the carriage portions, wherein each of the plurality of fall prevention portions is preferably moved from the fourth position to the third position as the carriage portion is changed from the fourth attitude to the third attitude, and wherein each of the plurality of fall prevention portions is preferably moved from the third position to the fourth position as the carriage portion is changed from the third attitude to the fourth attitude.

With the arrangement described above, the third position is closer to the ladder than the fourth position; thus, the work platform can be made small along the rack fore and aft direction when each of the plurality of fall prevention portions is in the third position. On the other hand, when each of the plurality of fall prevention portions is in the fourth position, the plurality of fall prevention portions are on one side, along the rack fore and aft direction, of the ascending and descending area for a worker. Therefore, the plurality of fall prevention portions can prevent a worker, who climbs up and down through the ascending and descending area using the ladder, from falling. In addition, the plurality of fall prevention portions and the carriage portion are operatively connected with each other by the operatively connecting portion so that the plurality of fall prevention portions are moved as the attitude of the carriage portion is changed; thus, it is not necessary to move the plurality of fall prevention portions independently of the changing of the attitude of the carriage portion; thus, the time and effort to move the plurality of fall prevention portions can be saved.

In addition, the article storage facility preferably further comprises: a wire for suspending and supporting the pivotable member; a winch to which one end portion of the wire is connected to spool and feed out the wire; wherein the pivotable member is preferably changed from the second attitude to the first attitude as a result of the wire being spooled by the winch, and is changed from the first attitude to the second attitude as a result of the wire being fed out by the winch.

With the arrangement described above, the pivotable portion can be pivoted by operating the winch to change the state of the carriage portion to the first state and to the second state. Thus, a worker does not have to change the state of the carriage portion to the first state and to the second state while, at the same time, supporting the carriage portion, which makes it easier to change the state of the carriage portion to the first state and to the second state.

In addition, the platform storage section preferably has a fixed support, wherein the work platform preferably has a secondary carriage portion which can be moved, along the rack fore and aft direction, to a state in which the secondary carriage portion is supported by the fixed support and the carriage portion in the fourth attitude, and to a state in which the secondary carriage is supported by the carriage portion in the fourth attitude, wherein the ladder preferably is fixed to the secondary carriage portion, and wherein, as a result of the secondary carriage portion being moved along the rack fore and aft direction, the ladder is preferably moved to a first position at which the ladder is retracted to the first direction side with respect to the travel path as seen along the rack lateral direction or along the vertical direction, and to a second position at which the ladder overlaps with the trajectory as seen along the rack lateral direction or along the vertical direction.

For example, when changing the work platform from the first state to the second state, the attitude of the carriage portion is changed to its fourth attitude first. Subsequently, the secondary carriage portion supported by the stationary portion and the carriage portion is moved to a position in which it is supported by only the carriage portion. Since the ladder is fixed to the secondary carriage portion, the ladder is moved from the position in which the ladder is retracted to the first direction side of the travel path, to the position in which the ladder overlaps with the trajectory. Thus, by performing the changing of the attitude of the carriage portion and the moving of the ladder through the movement of the secondary carriage portion separately and independently, each of these tasks can be accomplished with smaller force compared with a case in which both of these tasks are performed together.

In addition, the ladder is preferably located on the first direction side with respect to a central portion, along the rack fore and aft direction, of the work platform when the work platform has been changed to the second state, wherein the work platform preferably has the plurality of fall prevention portions which are spaced apart from each other along the vertical direction, a platform mast to which a base portion of each of the plurality of fall prevention portions is connected to be pivotable about an axis extending along the rack lateral direction, and a connecting portion to which a distal end portion of each of the plurality of fall prevention portions is connected, wherein each of the plurality of fall prevention portions can preferably be moved between a fifth position and a sixth position, wherein, with an ascending and descending area being defined to be an extent of space through which a worker passes when the worker uses the ladder to climb up and down the ladder on the second direction side of the ladder, the sixth position is preferably a position in which a part of each of the plurality of fall prevention portions is located on the second direction side with respect to the ascending and descending area, wherein the fifth position is preferably a position closer to the ladder along the rack fore and aft direction than in the sixth position, wherein the secondary carriage portion is preferably configured such that dimension thereof along the rack fore and aft direction can be increased and reduced, to a third state in which the secondary carriage portion is reduced in dimension along the rack fore and aft direction, and to a fourth state in which the secondary carriage portion is increased in dimension along the rack fore and aft direction, wherein the work platform preferably has a holding mechanism for fixing the connecting portion to the secondary carriage portion to hold the plurality of fall prevention portions, and wherein the holding mechanism preferably holds each of the plurality of fall prevention portions in the sixth position with the secondary carriage portion in the fourth state and with each of the plurality of fall prevention portions in the sixth position.

With the arrangement described above, the fifth position is closer to the ladder than the sixth position; thus, the work platform can be made small along the rack fore and aft direction when each of the plurality of fall prevention portions is in the sixth position. On the other hand, when each of the plurality of fall prevention portions is in the sixth position, the plurality of fall prevention portions are on one side, along the rack fore and aft direction, of the ascending and descending area for a worker. Therefore, the plurality of fall prevention portions can prevent a worker, who climbs up and down through the ascending and descending area using the ladder, from falling. In addition, since each of the plurality of fall prevention portions can be held in the sixth position by the holding mechanism, each of the plurality of fall prevention portions does not move from the sixth position when a worker climbs up and down through the ascending and descending area using the ladder, which makes it easier for the worker to climb up and down through the ascending and descending area. In addition, when changing the work platform from the first state to the second state, for example, the carriage portion is changed to the fourth attitude first. Subsequently, the secondary carriage portion supported by the stationary portion and the carriage portion is moved to the position in which it is supported by only the carriage portion. Since the ladder is fixed to the secondary carriage portion, the ladder is moved from the position in which the ladder is retracted to the first direction side of the travel path, to the position in which the ladder overlaps with the trajectory. Thus, by performing the changing of the attitude of the carriage portion and the moving of the ladder through the movement of the secondary carriage portion separately and independently, each of these tasks can be accomplished with smaller force compared with a case in which both of these tasks are performed together.

In addition, the work platform preferably includes one or more platform portions which a worker can get onto, on an ascending and descending side, with the ascending and descending side being defined to be one of the first direction side and the second direction side with respect to the ladder, wherein each of the one or more platform portions preferably has a platform surface which a worker can get onto, wherein each of the one or more platform portions can preferably be changed between a fifth state and a sixth state, wherein, with an ascending and descending area being defined to be an extent of space through which a worker passes when the worker uses the ladder to climb up and down the ladder, the fifth state is preferably a state in which the platform surface extends generally along the vertical direction and along the rack lateral direction, and in which each of the one or more platform portions is located on an opposite side of the ladder with respect to the ascending and descending area, and wherein the sixth state is preferably a state in which the platform surface extends along the rack lateral direction and the rack fore and aft direction, and in which each of the one or more platform portions overlaps with the ascending and descending area.

With the arrangement described above, with each of the one or more platform portion changed to the fifth state, the platform portion does not overlap with the ascending and descending area, and the platform portion is becomes small in dimension along the rack fore and aft direction, making it less likely for the one or more platform portions to be in the way of a worker who climbs up and down through the ascending and descending area. In addition, with each of the one or more platform portions changed to the sixth state, the platform portions overlap with the ascending and descending area. And a worker who climbs up and down through the ascending and descending area can easily get onto any of the one or more platform portions. And when a worker performs a maintenance work on the article storage rack, etc., the worker can perform the maintenance work while on the platform surface, that extends along the rack fore and aft direction and the rack lateral direction, of any of the one or more platform portions provided to the work platform, which facilitates the maintenance work.

What is claimed is:

1. An article storage facility comprising:

article storage racks each having a plurality of article storage sections for storing articles, with article storage sections arranged one above another along a vertical direction and one next to another along a rack lateral direction, with the vertical direction being defined to be an up-and-down direction, the rack lateral direction being defined to be one direction that is perpendicular to the vertical direction, and a rack fore and aft direction being defined to be a direction that is perpendicular to the vertical direction and the rack lateral direction;

an article transport device which is capable of transferring an article between the article transport device and any of the plurality of article storage sections, and which is configured to move along a travel path formed along the rack lateral direction to transport an article;

a work platform which a worker can get onto, the work platform being capable of being moved along the travel path and having a ladder;

wherein, with a first direction being defined to be one direction along the rack fore and aft direction, a second direction being defined to be a direction that is along the rack fore and aft direction and that is opposite from the one direction, the article storage racks include a pair of storage racks formed by a first storage rack installed on a first direction side with respect to the travel path, and a second storage rack installed on a second direction side with respect to the travel path, wherein the article storage racks include a platform storage section for storing the work platform on the first direction side with respect to a trajectory which is an extent of space which is used exclusively by the article transport device when the article transport device moves along the travel path, wherein the platform storage section and the trajectory overlap each other at least in part, as seen along the rack fore and aft direction, and wherein the platform storage section and the second storage rack overlap each other at least in part, as seen along the rack fore and aft direction.

2. The article storage facility as defined in claim 1, wherein the work platform includes a carriage portion which supports the ladder and which can be moved along the rack lateral direction, wherein the carriage portion is configured such that dimension thereof along the rack fore and aft direction can be increased and reduced, wherein the work platform can be changed to a first state in which the carriage portion is reduced in dimension along the rack fore and aft direction, and to a second state in which the carriage portion is increased in dimension along the rack fore and aft direction, and wherein the work platform is placed in the first state when stored in the platform storage section, and is placed in the second state when moved along the travel path and along the rack lateral direction.

3. The article storage facility as defined in claim 2, wherein the platform storage section has a pivotable member which is pivotable about a pivot axis extending along the rack lateral direction and which can be connected to the carriage portion, wherein the pivot axis is located on the first direction side with respect to the trajectory, wherein the pivotable member is configured such that an attitude thereof can be changed, by pivoting the pivotable member, to a first attitude in which the pivotable member is located on the first direction side with respect to the trajectory, and to a second attitude in which the pivotable member has been pivoted from the first attitude toward the trajectory, wherein, when the pivotable member is in the first attitude with the pivotable member connected to the carriage portion, the carriage portion is in a third attitude in which the carriage portion is located on the first direction side with respect to the trajectory, wherein, when the pivotable member is in the second attitude with the pivotable member connected to the carriage portion, the carriage portion is in a forth attitude in which the carriage portion overlaps with the trajectory as seen along the vertical direction, as seen along the rack fore and aft direction, and as seen along the rack lateral direction, wherein, the carriage portion is formed such that, in the fourth attitude, a dimension of the carriage portion along the vertical direction is less than a dimension of the carriage portion along the rack fore and aft direction, as seen along the rack lateral direction, and wherein the dimension of the carriage portion along the rack fore and aft direction is increased when the carriage portion is moved from the third attitude to the fourth attitude whereas the dimension of the carriage portion along the rack fore and aft direction is reduced when the carriage portion is moved from the fourth attitude to the third attitude.

4. The article storage facility as defined in claim 3, wherein a guide portion for guiding the carriage portion along the travel path is provided, wherein the guide portion is in engagement with a travel rail installed along the travel path, wherein the carriage portion includes a connected portion which can be connected to the guide portion, wherein the connected portion is located at such a position that the connected portion can be connected to the guide portion when the pivotable member connected to the carriage portion is in the second attitude and the carriage portion is in the fourth attitude.

5. The article storage facility as defined in claim 3, wherein the work platform has an operatively connecting portion which operatively connects the ladder and the carriage portion with each other, wherein, with a first position being defined to be a position on the first direction side with respect to the trajectory as seen along the rack lateral direction or along the vertical direction, and a second position being defined to be a position that overlaps with the trajectory, as seen along the rack lateral direction or along the vertical direction, the ladder is in the second position when the work platform is in the second state, and wherein the operatively connecting portion moves the ladder from the second position to the first position as the carriage portion is changed from the fourth attitude to the third attitude, and moves the ladder from the first position to the second position as the carriage portion is changed from the third attitude to the fourth attitude.

6. The article storage facility as defined in claim 5, wherein the work platform has a plurality of fall prevention portions that are spaced apart from each other along the vertical direction, wherein each of the plurality of fall prevention portions can be moved between a third position and a fourth position, wherein the third position is a position at which each fall prevention portion is closer to the ladder along the rack fore and aft direction than at the fourth position, wherein an ascending and descending area for a worker who uses and climbs up and down the ladder is formed in a space surrounded by the ladder and the fall prevention portions when each of the plurality of fall prevention portions is in the fourth position, wherein the operatively connecting portion operatively connects the plurality of fall prevention portions with the carriage portions, wherein each of the plurality of fall prevention portions is moved from the fourth position to the third position as the carriage portion is changed from the fourth attitude to the third attitude, and wherein each of the plurality of fall prevention portions is moved from the third position to the fourth position as the carriage portion is changed from the third attitude to the fourth attitude.

7. The article storage facility as defined in claim 3, further comprising:

a wire for suspending and supporting the pivotable member;

a winch to which one end portion of the wire is connected to spool and feed out the wire;

wherein the pivotable member is changed from the second attitude to the first attitude as a result of the wire being spooled by the winch, and is changed from the first attitude to the second attitude as a result of the wire being fed out by the winch.

8. The article storage facility as defined in claim 3, wherein the platform storage section has a fixed support, wherein the work platform has a secondary carriage portion which can be moved, along the rack fore and aft direction, to a state in which the secondary carriage portion is supported by the fixed support and the carriage portion in the fourth attitude, and to a state in which the secondary carriage is supported by the carriage portion in the fourth attitude, wherein the ladder is fixed to the secondary carriage portion, and wherein, as a result of the secondary carriage portion being moved along the rack fore and aft direction, the ladder is moved to a first position at which the ladder is retracted to the first direction side with respect to the travel path as seen along the rack lateral direction or along the vertical direction, and to a second position at which the ladder overlaps with the trajectory as seen along the rack lateral direction or along the vertical direction.

9. The article storage facility as defined in claim 8, wherein the ladder is located on the first direction side with respect to a central portion, along the rack fore and aft direction, of the work platform when the work platform has been changed to the second state, wherein the work platform has the plurality of fall prevention portions which are spaced apart from each other along the vertical direction, a platform mast to which a base portion of each of the plurality of fall prevention portions is connected to be pivotable about an axis extending along the rack lateral direction, and a connecting portion to which a distal end portion of each of the plurality of fall prevention portions is connected, wherein each of the plurality of fall prevention portions can be moved between a fifth position and a sixth position, wherein, with an ascending and descending area being defined to be an extent of space through which a worker passes when the worker uses the ladder to climb up and down the ladder on the second direction side of the ladder, the sixth position is a position in which a part of each of the plurality of fall prevention portions is located on the second direction side with respect to the ascending and descending area, wherein the fifth position is a position closer to the ladder along the rack fore and aft direction than in the sixth position, wherein the secondary carriage portion is configured such that dimension thereof along the rack fore and aft direction can be increased and reduced, to a third state in which the secondary carriage portion is reduced in dimension along the rack fore and aft direction, and to a fourth state in which the secondary carriage portion is increased in dimension along the rack fore and aft direction, wherein the work platform has a holding mechanism for fixing the connecting portion to the secondary carriage portion to hold the plurality of fall prevention portions, and wherein the holding mechanism holds each of the plurality of fall prevention portions in the sixth position with the secondary carriage portion in the fourth state and with each of the plurality of fall prevention portions in the sixth position.

10. The article storage facility as defined in claim 1, wherein the work platform includes one or more platform portions which a worker can get onto, on an ascending and descending side, with the ascending and descending side being defined to be one of the first direction side and the second direction side with respect to the ladder, wherein each of the one or more platform portions has a platform surface which a worker can get onto, wherein each of the one or more platform portions can be changed between a fifth state and a sixth state, wherein, with an ascending and descending area being defined to be an extent of space through which a worker passes when the worker uses the ladder to climb up and down the ladder, the fifth state is a state in which the platform surface extends generally along the vertical direction and along the rack lateral direction, and in which each of the one or more platform portions is located on an opposite side of the ladder with respect to the ascending and descending area, and wherein the sixth state is a state in which the platform surface extends along the rack lateral direction and the rack fore and aft direction, and in which each of the one or more platform portions overlaps with the ascending and descending area.

* * * * *